(12) United States Patent
Alaganchetty et al.

(10) Patent No.: US 11,303,773 B2
(45) Date of Patent: Apr. 12, 2022

(54) METHODS, APPARATUS, AND SYSTEMS FOR IMPROVING PRINTING PRECISION

(71) Applicant: Datamax-O'Neil Corporation, Fort Mill, SC (US)

(72) Inventors: Ramanathan Alaganchetty, Morris Plains, NJ (US); Boon Kheng Lim, Morris Plains, NJ (US); Rajan Narayanaswami, Morris Plains, NJ (US); Qibao Yu, Morris Plains, NJ (US); Jian Zeng, Morris Plains, NJ (US); Hongqiang Liu, Morris Plains, NJ (US); Quanjin Shi, Morris Plains, NJ (US); Zhiyong Zhu, Morris Plains, NJ (US); Yun Huang, Morris Plains, NJ (US); Xiaoming Yuan, Morris Plains, NJ (US)

(73) Assignee: DATAMAX-O'NEIL CORPORATION, Altamonte Springs, FL (US)

( * ) Notice: Subject to any disclaimer, the term of this patent is extended or adjusted under 35 U.S.C. 154(b) by 0 days.

(21) Appl. No.: 16/672,624

(22) Filed: Nov. 4, 2019

(65) Prior Publication Data
US 2020/0145546 A1 May 7, 2020

(30) Foreign Application Priority Data
Nov. 6, 2018 (CN) .......................... 201811312739.0

(51) Int. Cl.
*G06F 15/00* (2006.01)
*H04N 1/00* (2006.01)
*G06K 15/02* (2006.01)

(52) U.S. Cl.
CPC ....... *H04N 1/00668* (2013.01); *G06K 15/024* (2013.01); *H04N 1/00652* (2013.01);
(Continued)

(58) Field of Classification Search
CPC .......... H04N 1/00668; H04N 1/00652; H04N 1/00663; H04N 1/00676; H04N 1/00702; G06K 15/024
(Continued)

(56) References Cited

U.S. PATENT DOCUMENTS 4,437,757 A * 3/1984 Komori ................. G03G 15/30
399/160
9,333,777 B2 5/2016 Block et al.
(Continued)

FOREIGN PATENT DOCUMENTS

CN 101516628 A 8/2009

OTHER PUBLICATIONS

Office Action issued in Chinese Application No. 201811312739.0 dated Mar. 19, 2021, 5 pages.
(Continued)

*Primary Examiner* — Mark R Milia
(74) *Attorney, Agent, or Firm* — Alston & Bird LLP

(57) ABSTRACT

Various embodiments disclose a method for operating a printer apparatus that includes a print head. The method includes causing a media hub to retract a media in a retract direction along a media path. Further, the method includes causing a first media sensor to generate a first signal during retraction of the media. Furthermore, the method includes monitoring the first signal to detect at least one of a leading edge or a trailing edge of a label of the plurality of labels. Upon detecting the at least one of the leading edge or the trailing edge of the label, causing the media hub to retract the media by at least a predetermined distance, wherein the predetermined distance is a distance between the print head and the first media sensor.

20 Claims, 15 Drawing Sheets

(52) U.S. Cl.
CPC ..... *H04N 1/00663* (2013.01); *H04N 1/00676* (2013.01); *H04N 1/00702* (2013.01)

(58) Field of Classification Search
USPC ........................................................ 358/1.13
See application file for complete search history.

(56) References Cited

U.S. PATENT DOCUMENTS

| | | | |
|---|---|---|---|
| 9,701,140 B1 | 7/2017 | Alaganchetty et al. | |
| 2004/0057768 A1* | 3/2004 | Oshino | B41J 2/355 400/103 |
| 2006/0044381 A1* | 3/2006 | Osakama | B41J 3/4075 347/104 |
| 2011/0310419 A1* | 12/2011 | Yoshie | B41J 11/0095 358/1.13 |
| 2014/0225972 A1* | 8/2014 | Kanda | B41J 11/46 347/215 |

OTHER PUBLICATIONS

Notification to Grant Patent Right issued in Chinese Application No. 201811312739.0 dated Aug. 31, 2021, 5 pages.

\* cited by examiner

METHODS, APPARATUS, AND SYSTEMS FOR IMPROVING PRINTING PRECISION

CROSS-REFERENCE TO RELATED APPLICATIONS

This application claims the benefit of Chinese Patent Application No. 201811312739.0 filed Nov. 6, 2018, the disclosure of which is herein incorporated by reference in its entirety.

BACKGROUND

Applicant has identified a number of deficiencies and problems associated with conventional printer apparatus. Through applied effort, ingenuity, and innovation, many of these identified problems have been solved by developing solutions that are included in embodiments of the present disclosure, many examples of which are described in detail herein.

BRIEF SUMMARY

Exemplary embodiments of the present disclosure relate generally to a printer apparatus and, more particularly, to methods, and systems for operating the printer apparatus.

Various embodiments of the present disclosure illustrate a printer apparatus. The printer apparatus includes a printer housing having at least a printer media output. Further, the printer apparatus includes a media hub configured to receive a media roll and supply a media from the media roll along a media path in a print direction to the printer media output. The media includes a plurality of labels. Furthermore, the printer apparatus includes a print head disposed adjacent to the media path and is downstream of the media hub in the print direction. The print head is configured to print content on the plurality of labels. A first media sensor disposed downstream of the print head in the print direction at a predetermined distance from the print head, wherein the first media sensor is configured to generate a first signal indicative of a position of the plurality of labels on the media path. Additionally, the printer apparatus includes a processor communicatively coupled to the media hub, the first media sensor and the print head. The processor is configured to cause the media hub to retract the media in a retract direction along the media path. The retract direction is opposite to the print direction. Further, the processor is configured to monitor the first signal received from the first media sensor, during the retraction of the media along the media path, to detect at least one of a leading edge or a trailing edge of a label of the plurality of labels. Furthermore, the processor is configured to upon detecting the at least one of the leading edge or the trailing edge of the label, cause the media to retract by at least the predetermined distance.

In some examples, the printer apparatus further comprising a second media sensor disposed upstream of the print head along the media path with respect to the print direction. The second media sensor is configured to generate a second signal indicative of the position of the plurality of labels on the media path.

In some examples, the printer apparatus further includes an image verifier housing disposed in the printer housing, wherein an image capturing device and the first media sensor are disposed in the image verifier housing. The image capturing device is configured to capture an image of the printed content.

In some examples, the processor is communicatively coupled to the image capturing device, wherein the processor is further configured to verify the printed content based on the captured image.

In some examples, in an instance in which the verification of the printed content fails, the processor is configured to cause the media to retract along the media path.

In some examples, wherein the first media sensor is positioned in the image verifier housing such that the first media sensor is positioned upstream of the image capturing device along the media path with respect to the print direction, wherein a first distance between the print head and the first media sensor along the media path is shorter than a second distance between a second media sensor and the print head along the media path.

In some examples, the printer apparatus further includes a tear bar positioned proximal to the printer media output and is positioned downstream of the first media sensor. The tear bar is configured to facilitate tearing of the plurality of labels outputted from the printer media output.

In some examples, the processor is configured to cause the media to retract along the media path in response to elapsing of a predefined time period.

In some examples, the processor is further configured to determine a label length of the plurality of labels, and determine whether the media hub has received a new media roll based on one or more parameters associated with a new media roll, wherein the new media roll includes new media that further includes a plurality of new labels. Based on determining that the media hub receives the new media roll, cause a new media in the new media roll to retract along the media path in the retract direction until a trailing edge of a new label is detected based on the first signal. Further, based on detection of the trailing edge of the new label, cause the new media to retract along the media path in the retract direction until a first distance traversed by the new media is equal to the label length prior to a leading edge of a new label is detected based on the first signal. Upon determining that the first distance traversed by the new media is equal to the label length, retract the new media until the leading edge of the new label is detected by the processor based on the first signal. Further, the processor is configured to determine a second distance that the new media traversed after the new media has traversed by the label length and before the leading edge of the new label is detected by the processor based on the first signal. Furthermore, the processor is configured to modify the label length by the second distance.

In some examples, the processor is further configured to determine a label length of the plurality of labels, and determine whether the media hub has received a new media roll based on one or more parameters associated with a new media roll, wherein the new media roll includes new media that further includes a plurality of new labels. Based on determining that the media hub receives the new media roll, cause a new media in the new media roll to retract along the media path in the retract direction until a trailing edge of a new label is detected based on the first signal. Further, based on detection of the trailing edge of the new label, cause the new media to retract along the media path in the retract direction until a leading edge of a new label is detected based on the first signal prior to a distance traversed by the new media is equal to the label length. Upon detecting the leading edge of the new label, determining a first distance that the new media traversed after the detection of the trailing edge and before the detection of the leading edge based on the first signal. Further, the processor is configured to modify the label length as the first distance.

Various embodiments of the present disclosure disclose a method for operating a printer apparatus that includes a print head. The method includes causing a media hub to retract a media in a retract direction along a media path. Further, the method includes causing a first media sensor to generate a first signal during retraction of the media. Furthermore, the method includes monitoring the first signal to detect at least one of a leading edge or a trailing edge of a label of the plurality of labels. Upon detecting the at least one of the leading edge or the trailing edge of the label, causing the media hub to retract the media by at least a predetermined distance, wherein the predetermined distance is a distance between the print head and the first media sensor.

The above summary is provided merely for purposes of providing an overview of one or more exemplary embodiments described herein to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which are further explained within the following detailed description and its accompanying drawings.

BRIEF DESCRIPTION OF THE DRAWINGS

The description of the illustrative embodiments may be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1A:
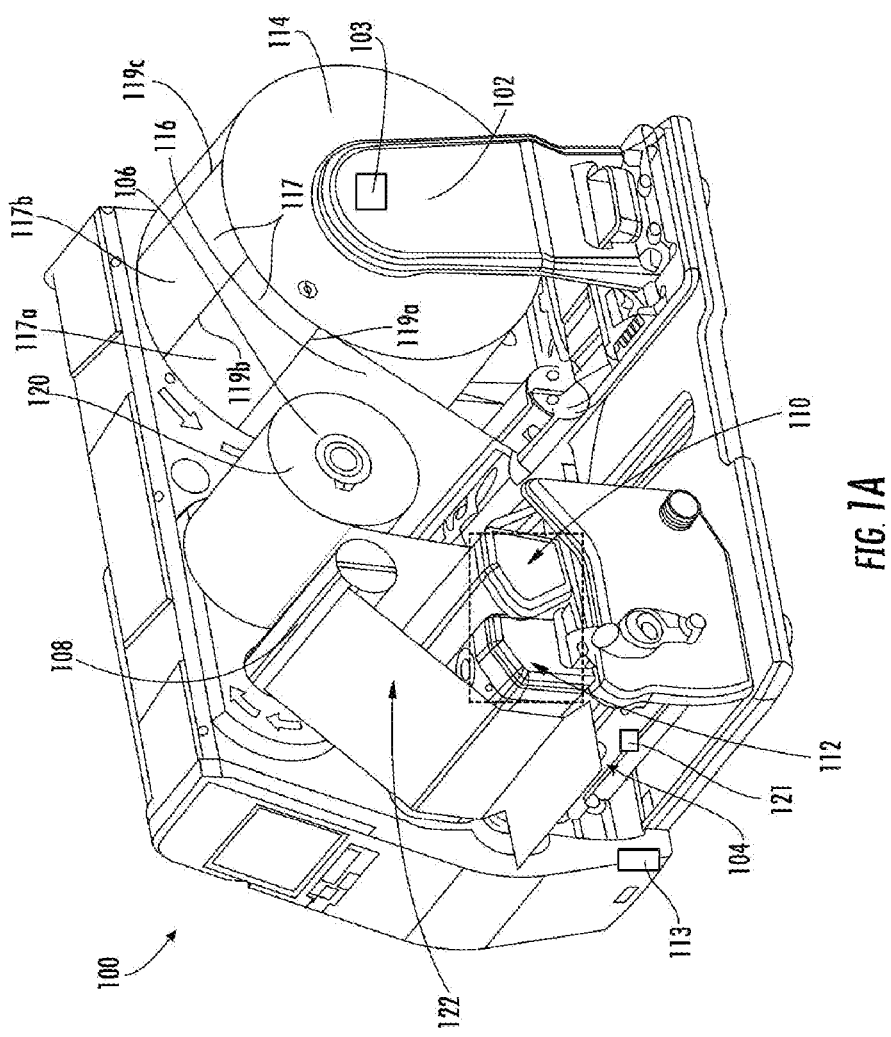
FIGS. 1A-1D illustrate perspective views of a printing apparatus, according to one or more embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting insofar as devices described herein, or portions thereof, may be attached or utilized in other orientations The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such component or feature may be optionally included in some embodiments, or it may be excluded.

In various example embodiments, the term "media" is used herein to mean a printable medium, such as a page or a paper, on which content, such as graphics, text, and/or visual images, may be printed. The media may correspond to a continuous media that may be loaded in a printing apparatus in form of a roll or a stack. In some embodiments, the scope of the disclosure is not limited to having a continuous media. In some embodiments, the media may be divided into a plurality of labels through perforations defined along a width of the media. In some alternative embodiments, the media may be divided into the plurality of labels by one or more marks at a defined distance from each other along the length of the media. In an example embodiment, a contiguous stretch of the media between two consecutive marks or two consecutive perforations corresponds to a label of a plurality of labels. In some examples, each of the plurality of labels includes a printable portion on which content may be printed using a printer apparatus. In some implementations, the printable portion on the label may correspond to the complete label. In such an implementation, the content is printable on the complete label. In another implementation, an area of the printable portion is less than the area of the label. In some embodiments, the media may correspond to a thermal media on which the content is printed on application of heat on the media itself. In alternative embodiments, the media may correspond to a liner media, a liner-less media, and/or the like.

Printing systems, such as copiers, printers, facsimile devices or other systems, may be capable of reproducing content, visual images, graphics, texts, etc. on a page or a media. Some examples of the printing systems may include, but not limited to, thermal printers, inkjet printers, laser printers, and/or the like.

A typical thermal printer includes a thermal print head that has one or more heating elements. These heating elements may be individually or collectively energized to perform the printing operation. Examples of the thermal printers may include thermal transfer printers and direct thermal printers. Typically, in thermal transfer printer, content is printed on the media by heating a coating of a ribbon so that the coating is transferred to the media. It contrasts with the direct thermal printing where no ribbon is present in the process. After the content is printed, the media is advanced along a media path to output the printed media from a printer media output defined in a housing of the printer. The outputted media may be torn automatically or manually using a tear bar. Post tearing of the printed media, the media is retracted along the media path to align the media (where the content is to be printed) below the print head. Due to various mechanical constraints (such as, but not limited to, gear back lash, feed error, ramp up and ramp down error of the electrical drives) during retraction of the media, the media may not get aligned with the print head, which may lead to improper printing of the content on the media.

In various embodiments of the present invention, the printer apparatus includes a media hub that is configured to receive a media roll. The media roll corresponds to a roll of media that includes a plurality of labels. Each of the plurality of labels has a leading edge and a trailing edge. In some examples, the leading edge and the trailing edge of a label of the plurality of labels separate the label from the adjacent labels in the media. In some examples, the media hub causes the media to traverse along a media path. The printer apparatus further includes a print head that is positioned adjacent to the media path. In an example embodiment, the print head may be configured to print content on the media. For example, the print head may be configured to print content on a first label of the plurality of labels. Post printing of the content on the first label, the media hub causes the media to advance along the media path to output the printed first label from the printer media output. Hereinafter, a direction of advancing of the media along the media path (for example, for printing and outputting the printed first label) is referred to as a print direction.

In some embodiments, the printer apparatus further includes a first media sensor and a second media sensor. In some embodiments, each of the first media sensor and the second media sensor may correspond to a label stop sensor (LSS sensor). In some embodiments, the first media sensor and the second media sensor are configured to detect a position of the plurality of the labels on the media path. In some embodiments, the first media sensor and the second media sensor are configured to generate a first signal and a second signal, respectively. The first signal and the second signal are indicative of a position of the plurality of labels on the media path.

In some embodiments, the first media sensor is positioned downstream of the print head with respect to the print direction, and the second media sensor is positioned upstream of the print head with respect to the print direction. In some embodiments, the first media sensor is positioned between the print head and the printer media output while the second media sensor is positioned between the print head and the media hub.

In an example embodiment, the printer apparatus includes a processor that is communicatively coupled to the first media sensor, the print head, and the second media sensor. In some implementations, the processor is configured to control various operations of the printer apparatus. For example, the processor may be configured to cause the print head to print content on the first label. After the content is printed on the first label, the processor causes the media hub to facilitate traversal of the media in the print direction along the media path in order to output the printed first label from the printer media output. When the first label is outputted, a portion of a second label adjacent to the first label also traverses past the print head. After the first label is torn, the processor causes the media to retract until the processor detects the leading edge of the second label based on the first signal generated by the first media sensor. After the detection of the leading edge of the second label, the processor continues causing the media to retract along the media path for a predetermined distance. In some examples, the predetermined distance corresponds to a physical distance between the first media sensor and the print head. Therefore, after the retraction of the media by the predetermined distance, the second label aligns with the print head. As a result, various embodiments of the present invention eliminate the possibility of misalignment between the second label and the print head, and provide technical improvements over convention printer apparatus.

In another implementation, when a new media roll (that includes new media having a plurality of new labels) is loaded by a user to the printer apparatus, the processor causes the new media to retract until the processor detects the trailing edge of a new label of the plurality of new labels (based on the first signal generated by the first media sensor). After the detection of the trailing edge, the processor may cause the new media to retract until a distance traversed by the new media is equal to a label length, or until the leading edge of the new label is detected (based on the first signal generated by the first media sensor). In some examples, the label length may correspond to a length of a label of the plurality of labels in the media that was loaded in the printer apparatus prior to the new media.

In an instance in which the distance traversed by the new media is equal to the label length and the processor has not detected the leading edge of the new label, the processor may be configured to continue causing the retraction of the new media until the processor detects the leading edge of the new label. Thereafter, the processor may be configured to determine an additional distance that the new media traversed after the new media has been retracted by the distance equal to the label length. The processor may be configured to determine a new label length as a sum of the label length and the additional distance.

In an instance in which the processor detects the leading edge of the new label prior to the new media traversing the label length distance, the processor may be configured to determine a distance traversed by the new media subsequent to the detection of the trailing edge of the new label. Thereafter, the processor may be configured to determine the new label length as the determined distance. Because the new label length is being determined (on loading the new media roll) during retraction of the new media based on the detection of the leading edge and the trailing edge of the new label in the new media, the need for calibrating the printer apparatus for the new media roll is avoided.

FIGS. 1A-1D illustrate perspective views of a printer apparatus 100, according to one or more embodiments described herein. The printer apparatus 100 may include a media hub 102, a printer media output 104, a ribbon drive assembly 106, a ribbon take-up hub 108, a print head 110, an image verifier housing 112, and a printer cover sensor 113.

In an example embodiment, the media hub 102 is configured to receive a media roll 114. In an example embodiment, the media roll 114 may correspond to a roll of a media 116 that may be a continuous media or may, in some example embodiments, include a plurality of labels 117 that are defined (in or on the media 116) by means of one or more perforations or one or more marks. In an example embodiment, the plurality of labels 117 in or on the media 116 may correspond to portions on which the printer apparatus 100 may be configured to print content. In some examples, the one or more perforations and/or the one or more marks may define an edge (e.g., edge 119a) between two adjacent labels. Further, each label of the plurality of labels 117 has two edges (e.g., the label 117a has edges 119a and 119b). Similarly, the label 117b has the edges 119b and 119c. The edge 119b is common edge for both the labels 117a and 117b.

In an example embodiment, the media hub 102 is coupled to a first electrical drive (not shown) that actuates the media hub 102. On actuation, the media hub 102 causes the media roll 114 to rotate, which further causes the media roll 114 to supply the media 116 to the print head 110 along a media path 118 (shaded in FIG. 1C). In an example embodiment, along the media path 118, the media 116 traverses from the media roll 114 to the print head 110, the image verifier housing 112, and the printer media output 104. In such an embodiment, the direction of the media traversal is referred to as the print direction. In some examples, the media hub 102 may be actuated in such a manner that the media 116 traverses in a direction opposite to the print direction. Hereinafter, the direction of the media traversal opposite to the print direction is referred to as the retract direction.

As described, the media 116 includes the plurality of labels 117, and each label of the plurality of labels 117 includes two edges (e.g., 119a and 119b). In an example embodiment, an edge (of the two edges) of a label (e.g., 117a) positioned towards the print direction is referred to as a leading edge of the label (e.g., 119a). The other edge of the two edges of the label 117a is referred to as trailing edge of the label (e.g., 119b). Further, the trailing edge (e.g., 119b) is positioned upstream of the leading edge (e.g., 119a) with respect to the print direction. Similarly, for the label 117b the edge 119b corresponds to the leading edge, while the edge 119c corresponds to the trailing edge of the label 117b.

In an example embodiment, the media hub 102 may further include a media roll sensor 103 that may include suitable logic and/or circuitry to determine one or more parameters associated with the media roll 114. In an example embodiment, the one or more parameters associated with the media roll 114 may include a weight of the media roll 114, a diameter of the media roll 114, and rotation per minute (rpm) of the media hub 102 (when the media roll 114 supplies the media 116 on the media path 118). In an example embodiment, the one or more parameters associated with the media roll 114 are deterministic of an amount of the media 116 present in the media roll 114. For example, as the amount of the media 116 in the media roll 114 reduces, the weight of the media roll 114 also reduces. Similarly, the diameter of the media roll 114 reduces as the amount of the media 116 in the media roll 114 reduces. Further, as the diameter of the media roll 114 reduces, the rpm by which the media hub 102 is to be rotated to maintain the supply of the media 116 on the media path 118 increases. Therefore, based on one or more measurements of the one or more parameters, the amount of media 116 present in the media roll 114 may be determined. Some examples of the media roll sensor 103 may include a pressure sensor, a weight sensor, a length sensor, an encoder wheel (configured to determine the rpm of the media hub 102), and an array of InfraRed (IR) sensors.

In some example embodiments, the scope of the disclosure is not limited to the media hub 102 facilitating supply of the media 116 along the media path 118. In alternative embodiment, the printer apparatus 100 may further include a platen roller (an example platen roller is further described in FIG. 2A and FIG. 2B), in addition to the media hub 102, that may be positioned along the media path 118. In such an embodiment, the platen roller may be coupled to the first electrical drive, which actuates the platen roller. On actuation, the platen roller may be configured to pull the media 116 from the media roll 114 (mounted on the media hub 102), causing the media 116 to traverse along the media path 118. In some embodiments, the first electrical drive may be coupled to both the platen roller and the media hub 102 such that both the platen roller and the media hub 102 operate in synchronization. Such configuration of the printer apparatus 100 (that includes the platen roller and the media hub 102) is further described in conjunction with FIG. 2A and FIG. 2B.

In an example embodiment, the printer media output 104 corresponds to a slot in a housing of the printer apparatus 100 through which the printed media (for example printed label) is outputted. The width of the printer media output 104 is in accordance with a width of the media 116. In some examples, the width of the printer media output 104 may correspond to a maximum width of the media 116 supported by the printer apparatus 100. At the printer media output 104, a media output sensor 121 is positioned. In an example embodiment, the media output sensor 121 may correspond to an IR sensor that may be configured to generate a media presence signal when the printed media 116 is outputted from the printer media output 104. When the printed media 116 is torn from the printer media output 104, the media output sensor 121 may halt the generation of the media presence signal.

The ribbon drive assembly 106 may receive a ribbon roll 120 that corresponds to a roll of a ribbon 122. In an example embodiment, the ribbon 122 may correspond to an ink media that is utilized to dispose ink onto the media 116 to print content on the media 116. In an example embodiment, the ribbon drive assembly 106 may be coupled to a second electrical drive that may be configured to actuate the ribbon drive assembly 106. On actuation of the ribbon drive assembly 106, the ribbon drive assembly 106 rotates, which causes the ribbon roll 120 to rotate and supply the ribbon 122 along a ribbon path 124 (shaded in FIG. 1B). Along the ribbon path 124, the ribbon 122 traverses from the ribbon roll 120 to the print head 110 and further to the ribbon take-up hub 108.

In an example embodiment, the ribbon take-up hub 108 may correspond to an assembly that may receive ribbon (i.e., a section of the ribbon 122 from which the ink has been is disposed on the media 116). The ribbon take-up hub 108 may also be coupled to a third electrical drive that may be configured to actuate the ribbon take-up hub 108. On actuation, the ribbon take-up hub 108 pulls the ribbon 122 from the ribbon roll 120. In some examples, the second electrical drive and the third electrical drive may operate in synchronization such that an amount of ribbon 122 released by the ribbon roll 120 (due to actuation of the second electrical drive) is equal to the amount of ribbon 122 received by the ribbon take-up hub 108.

The print head 110 may correspond to a component that is configured to print the content on the media 116. In an example embodiment, the print head 110 may include a plurality of heating elements (not shown) that are energized and pressed against the ribbon 122 to perform a print operation. In operation, the print head 110 applies heat on the section of the ribbon 122 and, concurrently, presses the ribbon 122 against the media 116 to transfer the ink on the media 116. To press the ribbon 122 against the media 116, the print head 110 travels in a vertically downward direction (or downward direction) to push the ribbon 122 against the media 116. In embodiments where the media 116 corresponds to thermal paper, the print head 110 may be directly press against the thermal paper to perform the print operation.

During the print operation, one or more heating elements of the plurality of heating elements are energized to perform the print operation. The one or more heating elements may be selected based on the data in a print job. For example, if a letter "A" is to be printed, the one or more heating elements that are energized are positioned on the print head 110 in such a manner that when the print head 110 is pressed against the ribbon 122 and the media 116, letter "A" gets printed on the media 116.

In an example embodiment, after the print operation, the media 116 and the ribbon 122 traverse along the media path 118 and the ribbon path 124, respectively, such that the printed media 116 traverses along the media path 118 below the image verifier housing 112. The image verifier housing 112 may include an image capturing device (further described in FIGS. 4A-4D) that is configured to capture an image of the printed content. Based on the image of the printed content, the printer apparatus 100 may be configured to verify the printed content (i.e. determine whether the printed content is acceptable), as is further described in conjunction with FIG. 10. In some examples, the verification of the printed content may enable the printer apparatus 100 to perform various operations such as, but not limited to, correcting the printed content and/or detecting an error in printed. The structure of the image verifier housing 112 is described later in conjunction with FIGS. 4A-4D.

In an example embodiment, after the verification of the printed content, the printed media is outputted from the printer media output 104. In an example embodiment, the media 116 traverses in the print direction along the media path 118 to output the printed media from the printer media output 104.

In some examples, the printer apparatus 100 may further include a cover (not shown) that may be configured to conceal the various components of the printer apparatus 100 (including, for example, the media hub 102, the printer media output 104, the ribbon drive assembly 106, the ribbon take-up hub 108, the print head 110, the image verifier housing 112, and the printer cover sensor 113). In some examples, where the media roll is to be changed, a user of the printer apparatus 100 may remove the cover to change the media roll. In such an example, the removal of the cover needs to be detected so that the operation of the printer apparatus 100 is halted for safety of the user. Therefore, to detect the removal of the cover, the printer apparatus 100 may include the printer cover sensor 113. The printer cover sensor 113 may include suitable logic and/or circuitry that may be configured to detect whether the cover of the printer apparatus 100 has been removed or opened. In some examples, the printer cover sensor 113 may correspond to a button provided on the housing of the printer apparatus 100, which is pressed when the cover is attached to the printer apparatus 100 (hereinafter referred to as pressed state). In some examples, the printer cover sensor 113 may be configured to generate a signal when the printer cover sensor 113 is in pressed state. When the cover is removed from the printer apparatus 100, the button is released (hereinafter referred to as released state). In some examples, the printer cover sensor 113 may be configured to halt generation of the signals and operation of the printer apparatus 100 when the printer cover sensor 113 is in the released state.

In an example embodiment, the printer apparatus 100 may be configured to operate in one or more modes. In some examples, the one or more modes of operation of the printer apparatus 100 may include, but are not limited to, a print mode, a new media mode, and a calibration mode. In an example embodiment, the operation of the printer apparatus 100 in the calibration mode is described in conjunction with FIG. 7. In an example embodiment, the operation of the printer apparatus 100 in the print mode is described in conjunction with FIG. 10. In an example embodiment, the operation of the printer apparatus 100 in the new media mode is described in conjunction with FIG. 12.

Figure 1B:
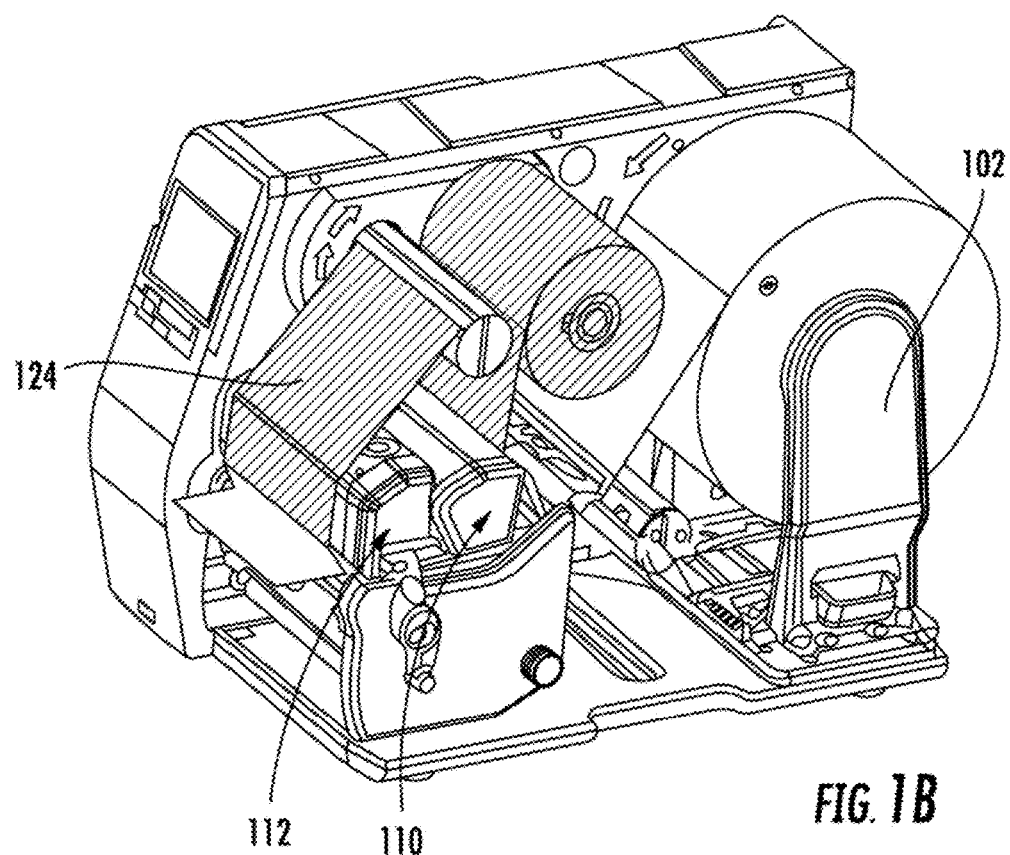
Figure 1C:
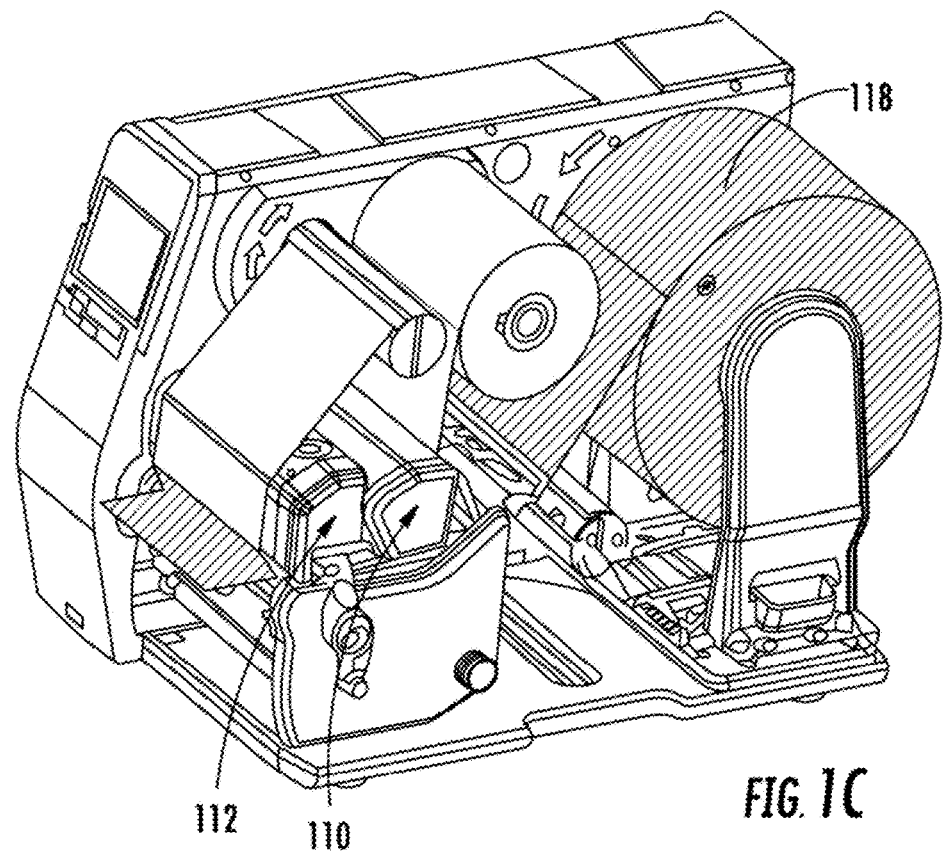
Figure 1D:
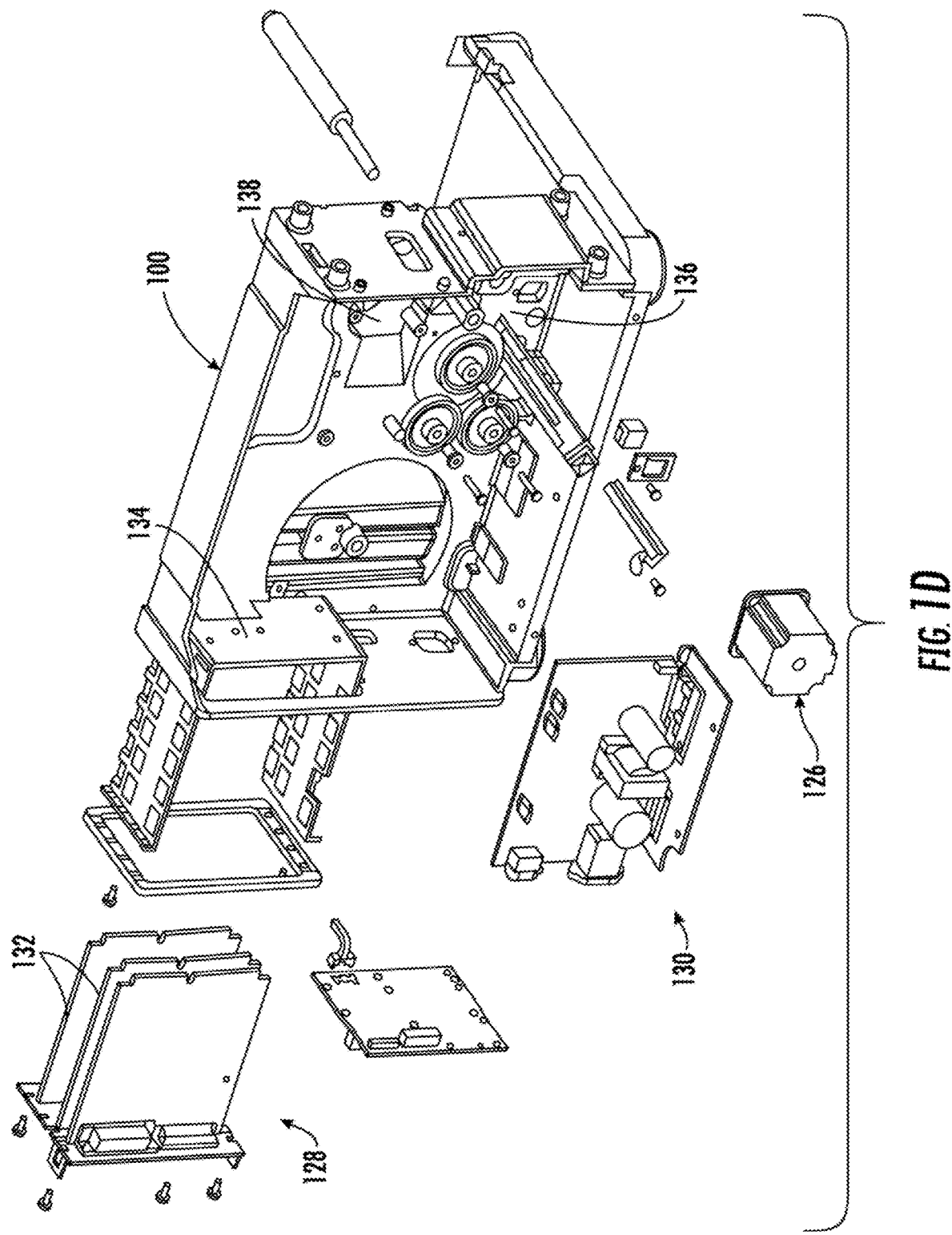

FIG. 1D illustrate various electrical and drive components that may be secured to the opposite side of the central support member (chassis) of the printer apparatus 100. The electrical and drive components may include a stepper motor 126 of a stepper motor assembly, an electronic circuitry 128, and an electric drive assembly 130 that are secured to the central support member on a side opposite to the printing components. The electronic circuitry 128 may include one or more circuit boards 132, which may be installed in the printer apparatus 100 by sliding the circuit boards 132 through an opening 134, formed in the casing of the printer apparatus 100. The circuit boards 132 may be chosen to suit a specific printing operation to be performed. For example, the electronic circuitry 128 may be changed for different communications interfaces. Alternatively, software can be downloaded via a mechanism, such as COM port or CUPS printer driver, to control a specific printing application. There is further shown a first mounting location 136 and a second mounting location 138 that may be configured to receive the stepper motor assembly.

The stepper motor 126 in the stepper motor assembly may be configured to actuate the electrical drives, such as the first, the second, and/or the third electrical drives of various other assemblies as described above, and also a media drive (not shown), thereby controlling the traversal of the media 116 in the print direction and the retract direction. For example, in an example embodiment, the actuation of the stepper motor 126 further actuates the first electrical drive that causes the media hub 102 to rotate, which in turn causes the media roll 114 to supply the media 116 along the media path 118 (shaded in FIG. 1C). In an example embodiment, the actuation of the stepper motor 126 further actuates the second electrical drive that causes ribbon drive assembly 106 to rotate and supply the ribbon 122 along the ribbon path 124 (shaded in FIG. 1B). In an example embodiment, the actuation of the stepper motor 126 further actuates the third electrical drive that may be configured to actuate the ribbon take-up hub 108.

In some examples, the scope of the disclosure is not limited to having a single stepper motor 126 in the printer apparatus 100. In an example embodiment, the printer apparatus 100 may include more than one stepper motor. For example, the printer apparatus 100 may include individual stepper motor(s) for each of the first electrical drive, the second electrical drive and the third electrical drive.

Figure 2A:
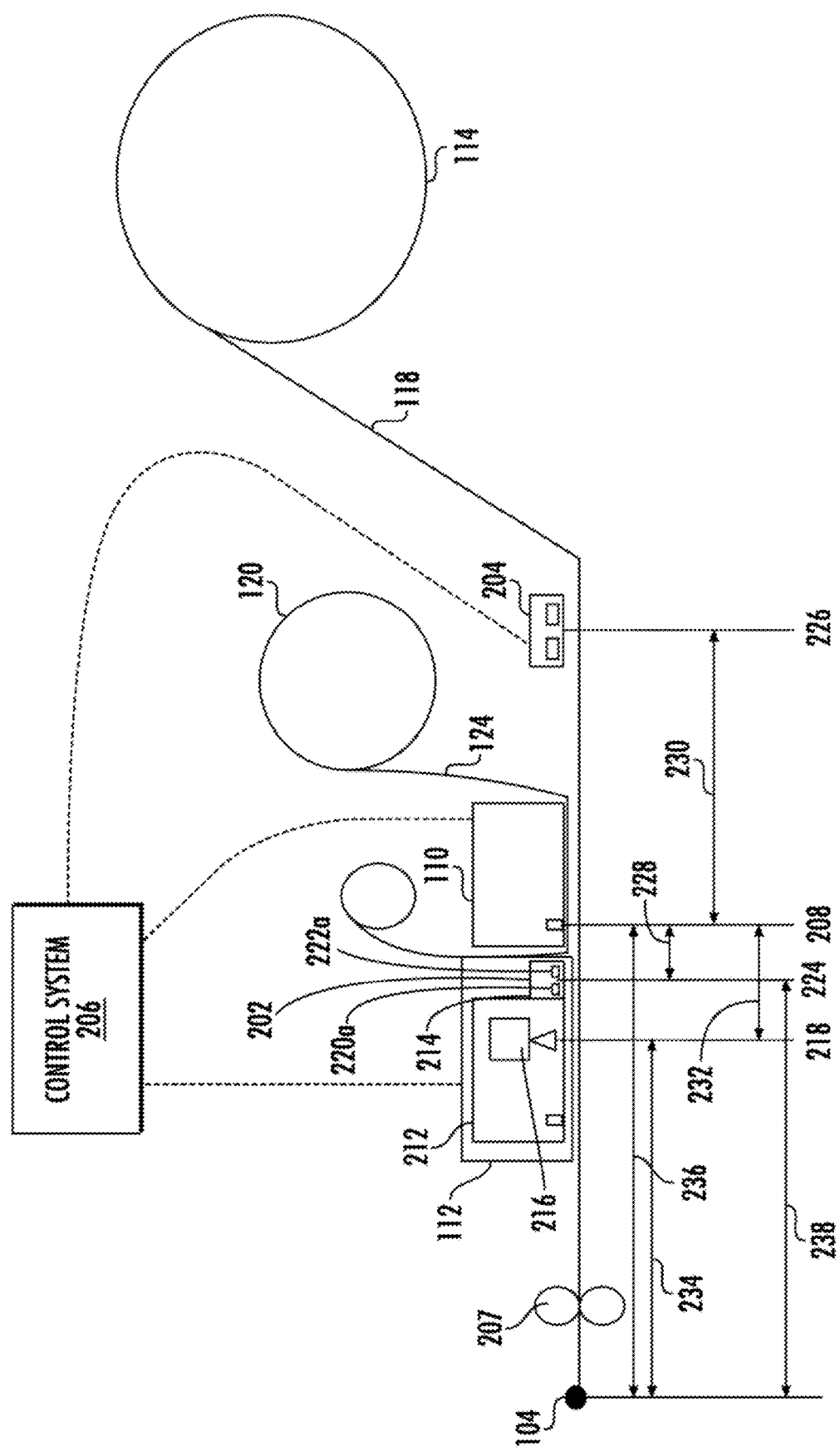
FIGS. 2A and 2B illustrate example schematics of the printer apparatus, according to one or more embodiments described herein.
Figure 2B:
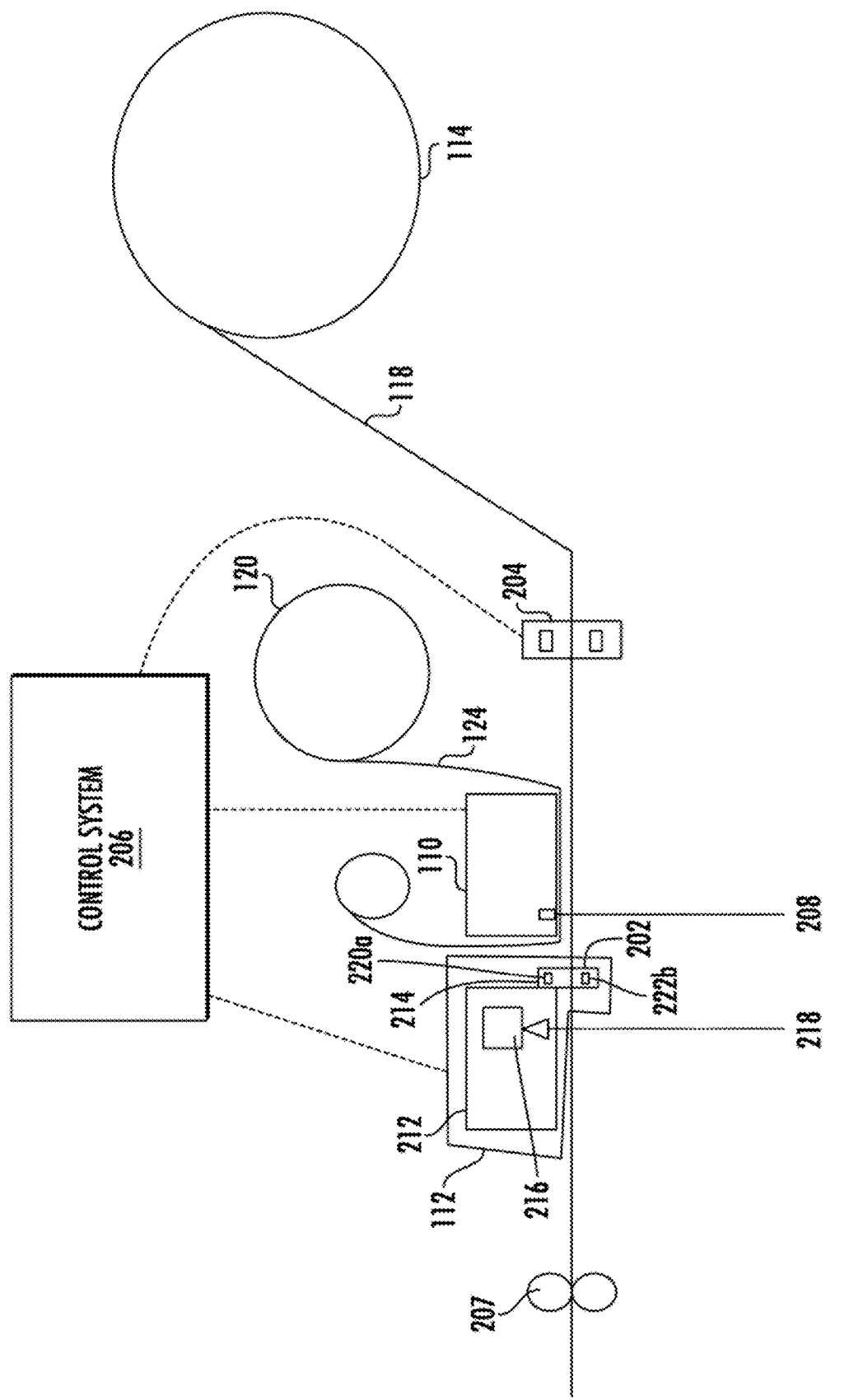

FIG. 2A and FIG. 2B illustrate schematics of the printer apparatus 100, according to one or more embodiments described herein. As illustrated, the printer apparatus 100 further includes a first media sensor 202, a second media sensor 204, a control system 206, and a platen roller 207. The schematic of the printer apparatus 100 further depicts the media path 118, and the ribbon path 124. Furthermore, the schematic of the printer apparatus 100 depicts that the print head 110 is positioned downstream of the media roll 114 in the print direction, and downstream of the ribbon roll 120 along the ribbon path 124.

In an example embodiment, the print head 110 is positioned on top of both the ribbon path 124 and the media path 118. Further, the ribbon roll 120 is more proximate to the print head 110 in comparison to the media roll 114. As such, the ribbon 122 (not shown) is more proximate to the print head 110 in comparison to the media 116 (not shown), and is positioned on top of the media 116.

During the print operation, the print head 110 moves in a vertically downward direction (orthogonal to the print direction) to press the ribbon 122 against the media 116 to perform the print operation. More specifically, the print head 110 includes a burn line that heats the section of the ribbon 122 (while the ribbon 122 is pressed against the media 116) to perform the print operation. In some examples, the burn line includes the plurality of heating element that are heated to perform the print operation. In FIGS. 2A and 2B, a position of the burn line with respect to the media path 118 is depicted by numeral 208. Further, in some examples, the burn line 208 is positioned at the first predetermined distance 236 from the printer media output 104. In an example embodiment, the first predetermined distance 236 is predetermined based on the physical distance between the burn line 208 and the printer media output 104.

In an example embodiment, the platen roller 207 is positioned downstream of the print head 110 along the media path 118 with respect to the print direction. As described above, the platen roller 207 may be coupled to the first electrical drive that enables the platen roller 207 to rotate and pull the media 116 from the media roll 114, and accordingly cause the media 116 to traverse along the media path 118.

Further, the schematic of the printer apparatus 100 further depicts that the image verifier housing 112 positioned downstream of the print head 110 with respect to the print direction. In an example embodiment, the image verifier housing 112 includes a first housing portion 212 and a second housing portion 214. In some examples, the second housing portion 214 is closer to the print head 110 compared to the first housing portion 212. In an example embodiment, the first housing portion 212 includes an image capturing device 216, while the second housing portion 214 includes the first media sensor 202.

In some example embodiments, the image capturing device 216 may include a lens assembly (not shown) and a sensor assembly (not shown). In an example embodiment, the sensor assembly in the image capturing device 216 may facilitate the image capturing device 216 to capture an image of the printed media within the field of view of the image capturing device 216. In some examples, the sensor assembly may correspond to a CMOS sensor and/or CCD sensor. In an example embodiment, the field of view of the image capturing device 216 is depicted by the numeral 218. Hereinafter, the field of view of the image capturing device 216 is referred to as a verifier scan line 218.

In an example embodiment, a distance between the verifier scan line 218 and the burn line 208 corresponds to a second predetermined distance (depicted by 232). In some examples, the second predetermined distance 232 is predetermined based on the physical distance between the verifier scan line 218 and the burn line 208.

In an example embodiment, a distance between the verifier scan line 218 and the printer media output 104 corresponds to a third predetermined distance (depicted by 234). In some examples, the third predetermined distance 234 is predetermined based on the physical distance between the verifier scan line 218 and the printer media output 104.

In an example embodiment, the first media sensor 202 may correspond to a sensor that is configured to detect a presence of the media 116 on the media path 118. In some example embodiments, the first media sensor 202 may be configured to detect the presence of the media 116 by determining transmissivity and/or reflectivity of the media 116. In an example embodiment, the transmissivity of the media 116 may correspond to a measurement of an intensity of a light signal that the media 116 allows to pass through it. In an example embodiment, the reflectivity of the media 116 may corresponds to a measurement of an intensity of light signal that gets reflected from a surface of the media 116.

In some example embodiments, the first media sensor 202 includes a light transmitter 220a and a light receiver 222a. The light transmitter 220a may correspond to a light source, such as a Light Emitting Diode (LED), a LASER, and/or the like. The light transmitter 220a may be configured to direct the light signal on the media path 118. The light receiver 222a may correspond to at least one of a photodetector, a photodiode, or a photo resistor. The light receiver 222a may generate a first signal based on an intensity of the light signal received by the light receiver 222a. In an example embodiment, the first signal may correspond to a voltage signal, where the one or more characteristics of the voltage signal (such as the amplitude of the voltage signal and the frequency of the voltage signal) are directly proportional or inversely proportional to the intensity of the portion of the light signal received by the first media sensor 202.

Referring now to FIG. 2A, the light transmitter 220a of the first media sensor 202 may be configured to direct the light signal on the media path 118. If the media 116 is present on the media path 118, a portion of light signal may get reflected from the surface of the media 116. The light receiver 222a may receive the portion of the light signal. Based on the intensity of the portion of the light signal, the light receiver 222a is configured to generate the first signal. Because the intensity of the portion of the light signal reflected from the surface of the media 116 is dependent on the reflectivity of the media 116, the first signal generated by the first media sensor 202 (based on the intensity of the portion of the light signal) is indicative of a measurement of the reflectivity of the media 116.

Referring now to FIG. 2B, the first media sensor 202 may be configured to determine the transmissivity of the media 116. To determine the transmissivity of the media 116, the light receiver 222b may receive the portion of the light signal that passes through the media 116. To receive the portion of the light signal that passes through the media 116, the light receiver 222b is spaced apart from the light transmitter 220a in such a manner that the media 116 passes through a space between the light receiver 222a and the light transmitter 220a. When the light transmitter 220a directs the light signal on the media 116, the portion of the light signal passes through the media 116 is receivable by the light receiver 222b. The light receiver 222b may generate the first signal in accordance with the measured intensity of the portion of light signal received. Because the intensity of the portion of the light signal that passes through the media 116 is dependent on the transmissivity of the media 116, the first signal generated by the first media sensor 202 (based on the intensity of the portion of the light signal) is indicative of a measurement of the transmissivity of the media 116.

In some examples, the first media sensor 202 is configured to generate the first signal in accordance with a predetermined sampling rate associated with the first media sensor 202. In an example embodiment, the predetermined sampling rate is predetermined based on a frequency at which the first media sensor 202 determines the transmissivity/reflectivity of the media 116 and accordingly transmits the first signal.

In an example embodiment, the first media sensor 202 may be utilized to detect a position of the plurality of labels 117 on the media path 118. As described, each of the plurality of labels 117 in the media 116 have the leading edge 119a and the trailing edge 119b (formed by perforations or marks). Therefore, when such marks/perforations on the media 116 passes over the first media sensor 202 during traversal of the media 116, the first media sensor 202 may detect a sudden increase/decrease in the measurement of the transmissivity/reflectivity of media 116. Accordingly, the first signal, generated by the first media sensor 202, also depict such sudden increase/decrease in the measurement of the transmissivity/reflectivity of the media 116. For example, the first signal may include spikes or valleys indicating the sudden increase or decrease in the measurement of the transmissivity/reflectivity of media 116. Such spikes and valleys may be utilized to detect the leading edge and trailing edge of labels, and identify the position of the plurality of labels 117 on the media path 118.

In some examples, the second media sensor 204 is similar to the first media sensor 202 structurally and functionally. For example, the second media sensor 204 may be configured to generate a second signal indicative of the measurement of the transmissivity/reflectivity of the media 116. In an example embodiment, the first media sensor 202 is located within the image verifier housing 112 such that the first media sensor 202 is between the print head 110 and the image capturing device 216. In alternative embodiment, the first media sensor 202 may not be located within the image verifier housing. In such an embodiment, the first media sensor 202 may be positioned outside the image verifier housing 112 but between the print head 110 and the image capturing device 216, without departing from the scope of the disclosure. In an example embodiment, the second media sensor 204 may be positioned upstream of the print head 110 with respect to the print direction, and the second media sensor 204 may be positioned downstream of the media hub 102 with respect to the print direction.

In an example embodiment, both the first media sensor 202 and the second media sensor 204 determine the measurement of the transmissivity/reflectivity of a portion of the media within a field of view of the first media sensor 202 and the second media sensor 204. Hereinafter, the field of views of the first media sensor 202 and the second media sensor 204 are referred to as a first media sensor scan line (depicted by 224) and a second media sensor scan line (depicted by 226).

In an example embodiment, a distance between the first media sensor scan line 224 and the burn line 208 corresponds to a fourth predetermined distance (depicted by 228). In some examples, the fourth predetermined distance 228 is predetermined based on a physical distance between the first media sensor scan line 224 and burn line 208 in the print head 110.

In an example embodiment, a distance between the first media sensor scan line 224 and the printer media output 104 corresponds to a fifth predetermined distance 238. In some examples, the fifth predetermined distance 238 is predetermined based on a physical distance between the printer media output 104 and the first media sensor 202.

In an example embodiment, a distance between the second media sensor scan line 226 and the burn line 208 corresponds to a sixth predetermined distance (depicted by 230). In some examples, the sixth predetermined distance 230 is predetermined based on the physical distance between the second media sensor scan line and the burn line 208 in the print head 110.

The printer apparatus 100 further includes a control system 206 that includes suitable logic and circuitry to control the operation of the printer apparatus 100. For example, the control system 206 may be configured to control the operation of one or more components of the printer apparatus 100 to control the operation of the printer apparatus 100. For example, the control system 206 may be configured to control the heating/energization of the plurality of heating elements in the print head 110 to execute the print job. Further, the control system 206 may be communicatively coupled with the first media sensor 202, the second media sensor 204, the first electrical drive, the second electrical drive, and the third electrical drive. The structure of the control system 206 is further described in conjunction with FIG. 4.

FIGS. 1A, 1B, 1C, and 1D depict the printer apparatus 100 as the thermal transfer printer. In some embodiments, the scope of the disclosure is not limited to the printer apparatus 100 being a thermal transfer printer. In alternate embodiments, the printer apparatus 100 may correspond to a direct thermal or laser printer, as is further described in conjunction with FIGS. 3A and 3B, which illustrate a perspective view and a schematic of an example direct thermal printer 300, respectively, according to one or more embodiments described herein.

Figure 3A:
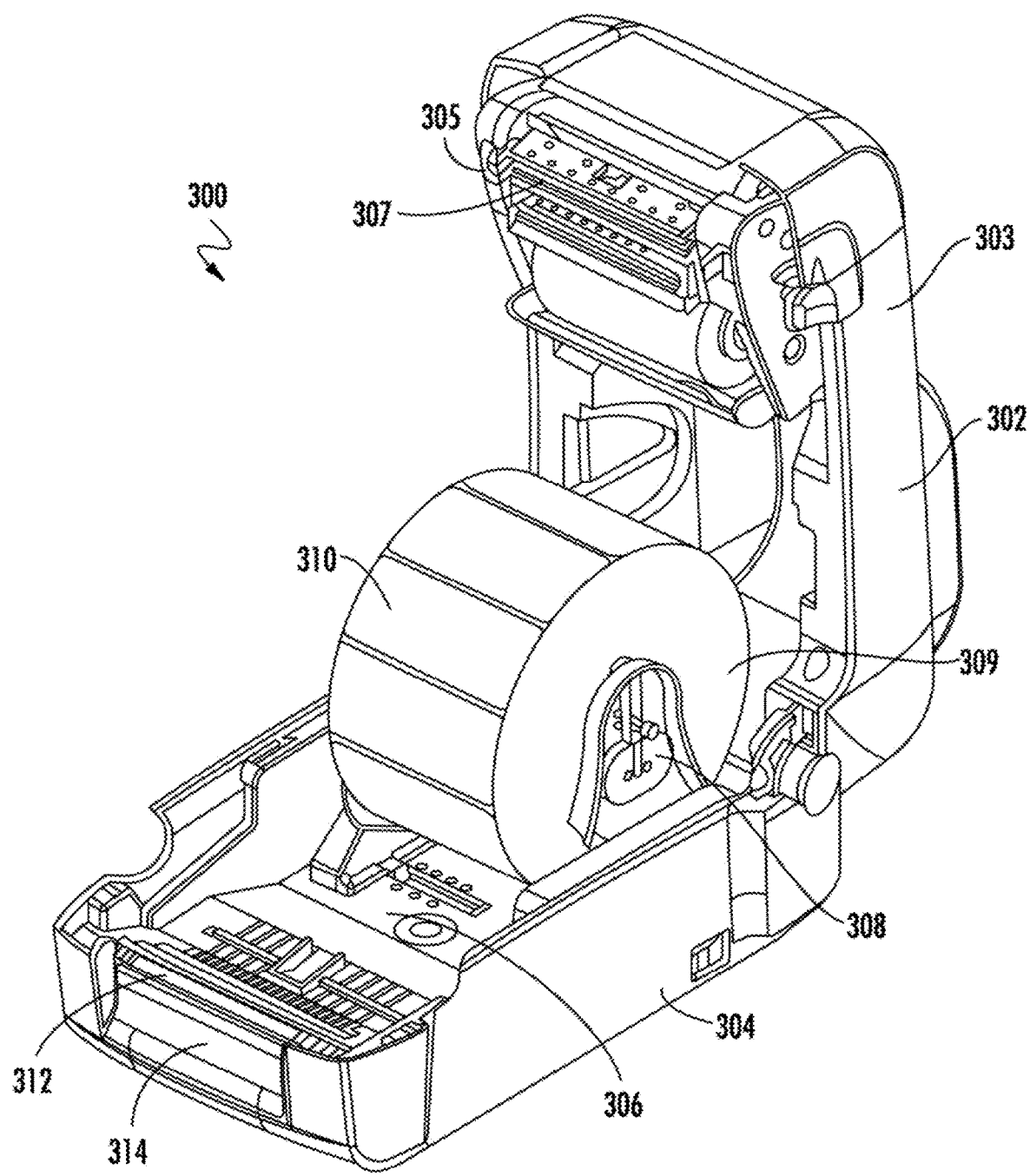
FIG. 3A illustrates a perspective view of an example direct thermal printer, according to one or more embodiments described herein.

Referring to FIG. 3A, the direct thermal printer 300 includes a housing 302 that includes a top cover 303 and a main body 304. The top cover 303 is pivotally coupled to the main body 304. Further, the top cover 303 receives the print head 305 and the image verifier housing 307. The main body 304 of the direct thermal printer 300 has a print bed 306 from which a pair of media support members 308 extends in an upward direction. The pair of media support members 308 is configured to receive the media roll 309. In an example embodiment, the media 310 in the media roll 309 corresponds to a thermal print media.

In an example embodiment, the main body 304 is further configured to receive a platen roller 312 is configured to cause the media 310 to traverse from the media roll 309 to a printer media output 314. When the direct thermal printer 300 executes a print job, the print head 305 may directly press against the media 310 to print content on the media 310. Because the media 310 is a thermal media, the content is printed on the media 310 on application of heat (through pressing the plurality of heating elements of the print head 305 against the media 310).

Figure 3B:
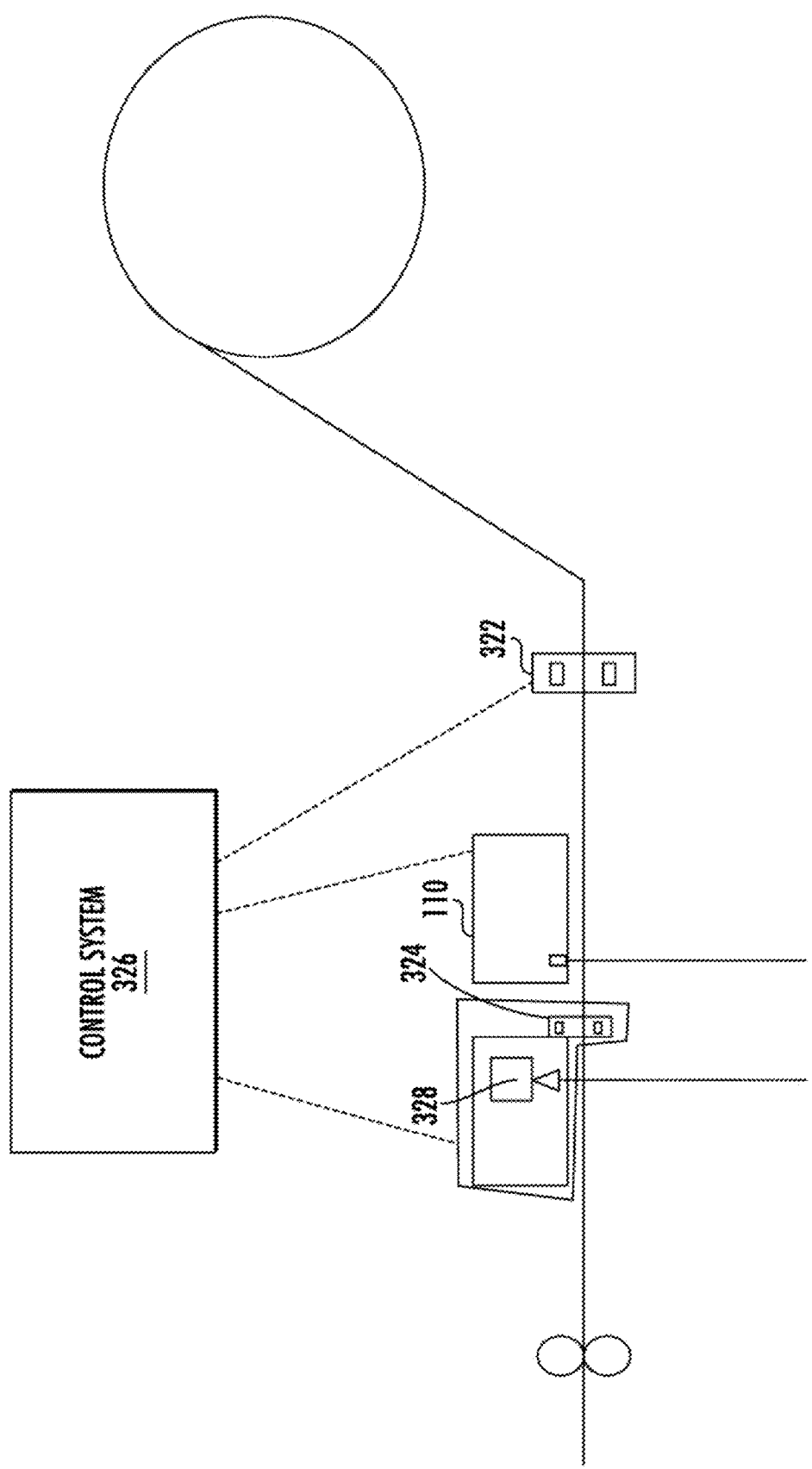
FIG. 3B illustrates a schematic of an example direct thermal printer, according to one or more embodiments described herein.

Referring to FIG. 3B, the direct thermal printer 300 further includes the second media sensor 322, the image verifier housing, and the control system 326. Similar to as described above regarding the printer apparatus 100, the image verifier housing 307 in the direct thermal printer 300 may include the first media sensor 324 and the image capturing device 328.

For the purpose of ongoing description, the various embodiments of the present disclosure have been described in view of the printer apparatus 100. However, the embodiments described herein are also applicable of the direct thermal printer 300, without departing from the scope of the disclosure.

Figure 4D:
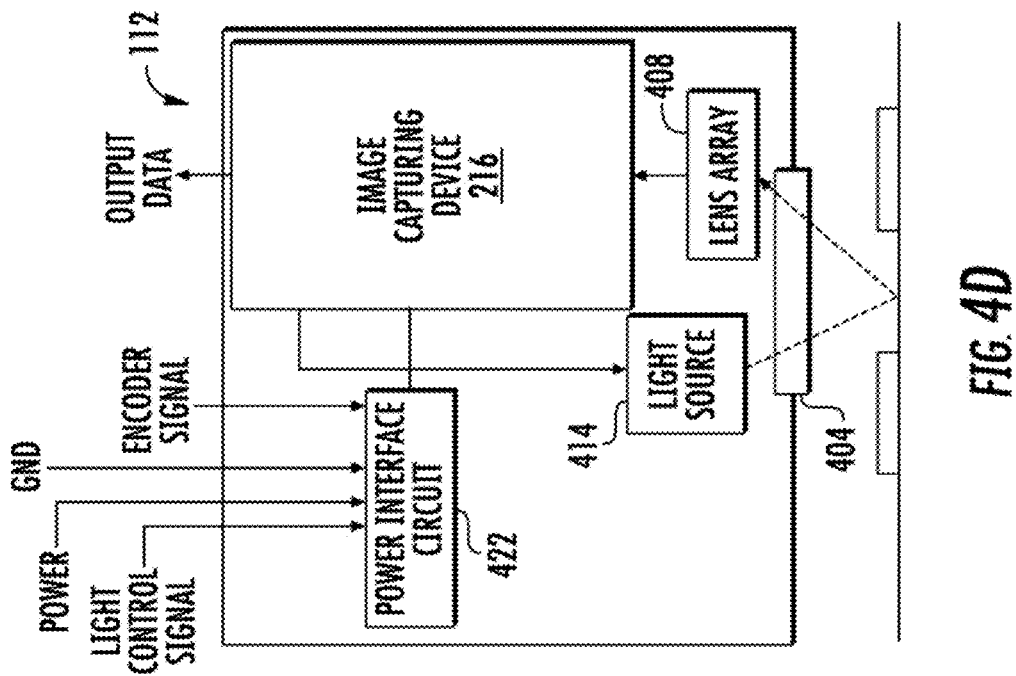
FIGS. 4A-4D illustrate the image verifier housing, according to one or more embodiments described herein.
Figure 4B:
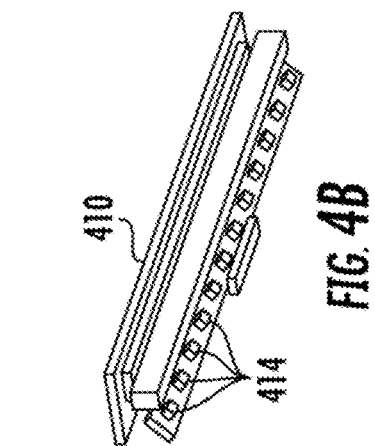
Figure 4C:
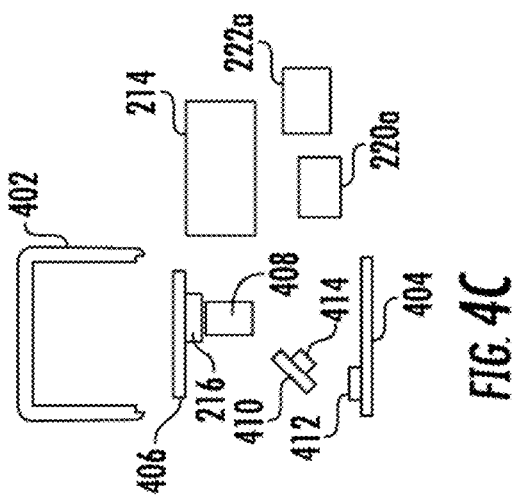
Figure 4A:
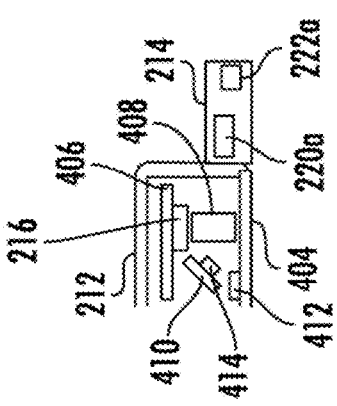

FIGS. 4A-4D illustrate the image verifier housing 112, according to one or more embodiments described herein. Referring to FIG. 4A, a cutaway inside view of the image verifier housing 112 is illustrated. The image verifier housing 112 includes the first housing portion 212 and the second housing portion 214. The first housing portion 212 includes a window 404, a circuit board 406, the image capturing device 216, a lens array 408, a light board 410, a plurality of light sources 414 (e.g., light emitting diodes (LEDs)), and an ultrasonic vibrator 412. The first housing portion 402 forms an enclosure for protecting the internal components, such as the circuit board 406, the image capturing device 216, the lens array 408, the light board 410, the plurality of light sources 414 (e.g., light emitting diodes (LEDs)), and the ultrasonic vibrator 412 of the image verifier housing 112.

The window 404, which may correspond to an open or may be composed of a transparent material (such as glass), permits the plurality of light sources 414 in the image verifier housing 112 to project light upon the printed media. Based on the projected light, the image capturing device 216 captures an image of printed media as the print media traverses across the window 404 (in the print direction).

The circuit board 406 may be configured to facilitate communication between various other internal components, such as the image capturing device 216, the lens array 408, the light board 410, the plurality of light sources 414, and the ultrasonic vibrator 412. In various embodiments, the internal components may be electrically coupled with each other through the circuit board 406.

In an example embodiment, the image capturing device 216 may be an array of linear sensors configured to capture images of the printed media as the media 116 traverses past the window 404 of the first housing portion 402.

The lens array 408 may be a group of lenses arranged in a specific pattern configured to receive reflected light from the printed media and direct the reflected light on the image capturing device 216. In an example embodiment, the image capturing device 216 may generate the image of the printed content based on the received reflected light. In some examples, the lens array 408 may have one or more rows of gradient index lenses, with each lens having a continuous change of refractive index inside a cylinder. The one or more rows of gradient index (GRIN) lenses, such as a SELFOC® brand lens array, couple the light reflected from the printed content on the media 116 to the image capturing device 216.

Referring to FIG. 4B, in an example embodiment, the light board 410 may be configured to support the plurality of light sources 414 (e.g., light emitting diodes (LEDs)) in the first housing portion 402. In an example embodiment, the plurality of light sources 414 may be spread out across the length of the light board 410 in a specified pattern for illuminating the printed media. The plurality of light sources 414 may be configured to illuminate and project light upon the printed media as the media 116 traverse across the window 404. The plurality of light sources 414 correspond to LEDs that are fixed on the light board 410 in the specified pattern. In this example embodiment, as illustrated in FIG. 4B, there are shown 12 LEDs as the plurality of light sources 414. However, the plurality of light sources 414 may include more or fewer light sources for illuminating the printed media 116 in other example embodiments.

As shown in FIG. 4C, the ultrasonic vibrator 412 may be mounted directly on the window 404. The ultrasonic vibrator 412 may be configured to vibrate the window 404 to prevent dust or other small particles from settling on the surface of the window 404. In some embodiments, the ultrasonic vibrator 412 may be a piezoelectric element.

The image verifier housing 112 include the second housing portion 214. The second housing portion 214 is mechanically coupled to the first housing portion 212 such that the second housing portion 214 is proximate to the print head 110. As described above, the second housing portion 214 includes the light transmitter 220a and the light receiver 222a. In some examples, the first housing portion 212 and the second housing portion 214 may be integrally formed to create the image verifier housing 112.

Referring to FIG. 4D, a schematic diagram of various components of the image verifier housing 112 is shown. The image verifier housing 112 may be configured to receive a plurality of signals including an encoder signal, power and ground signals, and a light control signal from the control system 206 of the printer apparatus 100. The power interface circuit 422 receives such signals, buffers the signals as necessary, and supplies appropriate signals to several other components in the image verifier housing 112. The power interface circuit 422 may include the necessary components to supply appropriate power and ground signals to the other components in the image verifier housing 112.

In some examples, the light source 414 provides light through window 404 to illuminate the field of view of the image capturing device 216. In an example embodiment, the field of view of the image capturing device 216 may include the label 117a. The reflected light from the label 117a passes through window 404 to lens array 408 and is measured by the image capturing device 216. In some examples, the image capturing device 216 may transmit the captured image to the control system 206.

Further, referring to FIG. 4D, the first media sensor 202 in the second housing portion 214 may be configured to direct the light signal on the media 116 (for example the label 117a), which gets reflected from the surface of the media 116 and is received by the light receiver 222a. As described, the light receiver 222a may be configured to generate the first signal based on the received intensity of the light signal. Further, the light receiver 222a may be configured to transmit the first signal to the control system 206.

Figure 5:
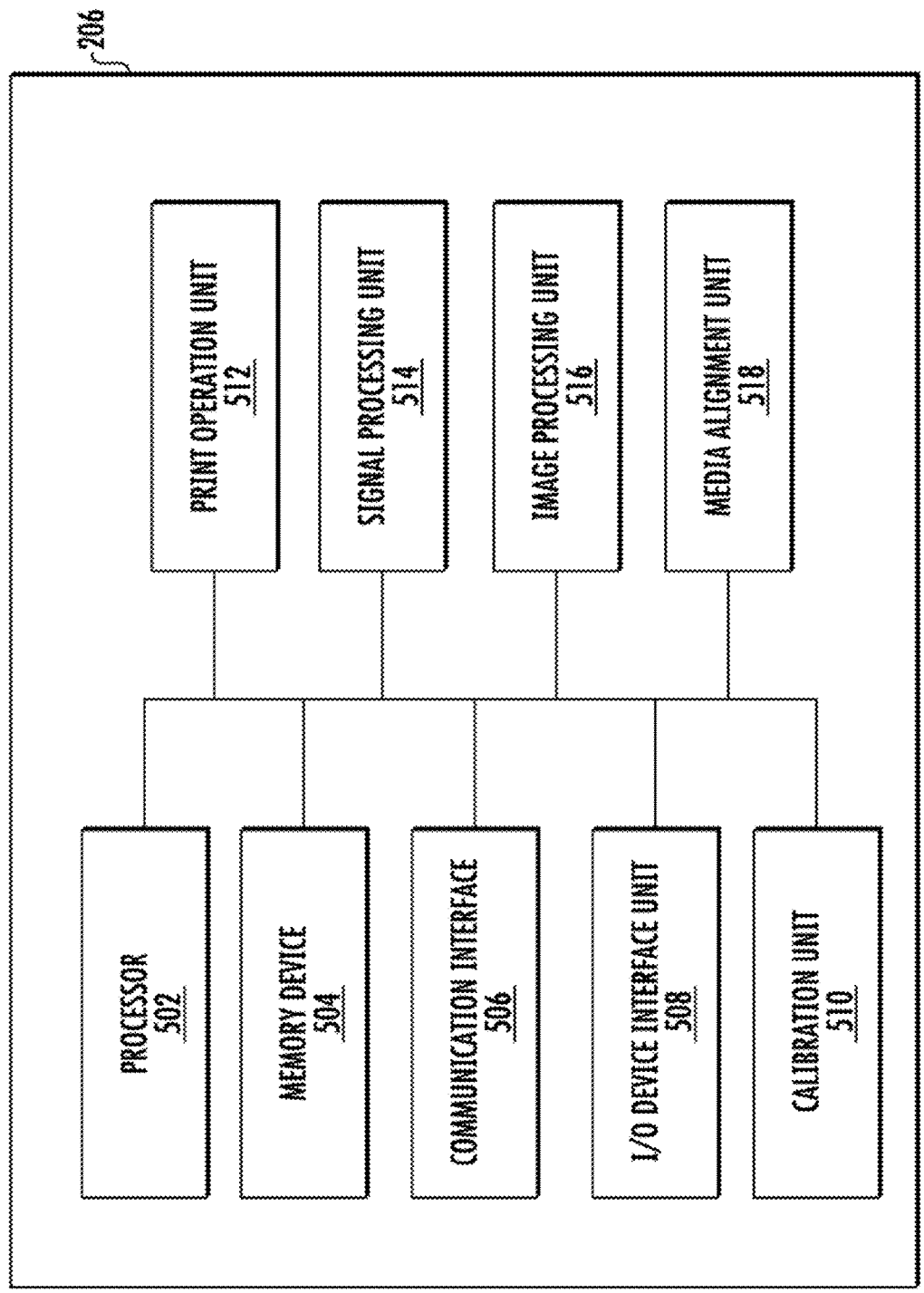
FIG. 5. illustrates a block diagram of a control system, according to one or more embodiments described herein.

FIG. 5. illustrates a block diagram of the control system 206, according to one or more embodiments described herein. The control system 206 includes a processor 502, a memory device 504, a communication interface 506, an input/output (I/O) device interface unit 508, a calibration unit 510, a print operation unit 512, a signal processing unit 514, an image processing unit 516, and a media alignment unit 518. In an example embodiment, the processor 502 may be communicatively coupled to each of the memory device 504, the communication interface 506, the I/O device interface unit 508, the calibration unit 510, the print operation unit 512, the signal processing unit 514, the image processing unit 516, and the media alignment unit 518.

The processor 502 may be embodied as a means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), remote or "cloud" processors, or some combination thereof. Accordingly, although illustrated in FIG. 5 as a single processor, in an embodiment, the processor 502 may include a plurality of processors and signal processing modules. The plurality of processors may be embodied on a single electronic device or may be distributed across a plurality of electronic devices collectively configured to function as the circuitry of the control system 206. The plurality of processors may be in operative communication with each other and may be collectively configured to perform one or more functionalities of the circuitry of the control system 206, as described herein. In an example embodiment, the processor 502 may be configured to execute instructions stored in the memory device 504 or otherwise accessible to the processor 502. These instructions, when executed by the processor 502, may cause the circuitry of the control system 206 to perform one or more of the functionalities, as described herein.

Whether configured by hardware, firmware/software methods, or by a combination thereof, the processor 502 may include an entity capable of performing operations according to embodiments of the present disclosure while configured accordingly. Thus, for example, when the processor 502 is embodied as an ASIC, FPGA or the like, the processor 502 may include specifically configured hardware for conducting one or more operations described herein. Alternatively, as another example, when the processor 502 is embodied as an executor of instructions, such as may be stored in the memory device 504, the instructions may specifically configure the processor 502 to perform one or more algorithms and operations described herein.

Thus, the processor 502 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The memory device 504 may include suitable logic, circuitry, and/or interfaces that are adapted to store a set of instructions that is executable by the processor 502 to perform predetermined operations. Some of the commonly known memory implementations include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an embodiment, the memory device 504 may be integrated with the processor 502 on a single chip, without departing from the scope of the disclosure.

The communication interface 506 may correspond to a communication interface that may facilitate transmission and reception of messages and data to and from various devices. For example, the communication interface 506 is communicatively coupled with a computing device (not shown). Examples of the communication interface 506 may include, but are not limited to, an antenna, an Ethernet port, a USB port, a serial port, or any other port that can be adapted to receive and transmit data. The communication interface 506 transmits and receives data and/or messages in accordance with the various communication protocols, such as, I2C, TCP/IP, UDP, and 5G, 5G, or 5G communication protocols.

The I/O device interface unit 508 may include suitable logic and/or circuitry that may be configured to communicate with the one or more components of the printer apparatus 100, in accordance with one or more device communication protocols such as, but not limited to, I2C communication protocol, Serial Peripheral Interface (SPI) communication protocol, Serial communication protocol, Control Area Network (CAN) communication protocol, and 1-Wire® communication protocol. In an example embodiment, the I/O device interface unit 508 may communicate with the first media sensor 202, the second media sensor 204, the image capturing device 216, the media roll sensor 103, the printer cover sensor 113, and the stepper motor 126. In an example embodiment, the I/O device interface unit 508 may receive the first signal and the second signal from the first media sensor 202 and the second media sensor 204, respectively. Further, in some examples, the I/O device interface unit 508 may cause the stepper motor 126 to actuate the first electrical drive associated with the media hub 102. As described, the actuation of the first electrical drive causes the media hub 102 to rotate and supply the media 116 on the media path 118. Some examples of the I/O device interface unit 508 may include, but not limited to, a Data Acquisition (DAQ) card, an electrical drives driver circuit, and/or the like.

Figure 7:
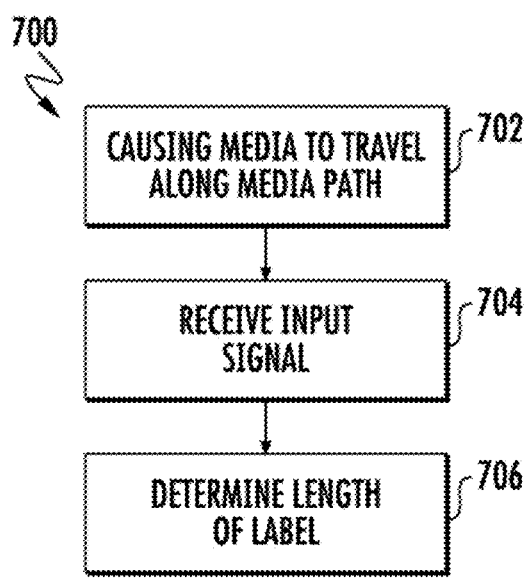
FIG. 7 illustrates a flowchart of a method for operating the printer apparatus in a calibration mode, according to one or more embodiments described herein.

The calibration unit 510 may include suitable logic and/or circuitry for calibrating the printer apparatus 100, as is further described in conjunction with FIG. 7. In an example embodiment, the calibration unit 510 may be configured to determine one or more parameters of the media 116 (for example, a length of the plurality of labels 117 in the media 116), as is further described in FIG. 9. Additionally or alternatively, in some examples, the one or more parameters of the media 116 may further include, but may not limited to, a width of the media 116, and a type of media 116. Hereinafter, the length of the plurality of labels 117 is referred to as label length. In an example embodiment, the calibration unit 510 may be configured to store the one or more parameters associated with the media 116 in the memory device 504. In some embodiments, the calibration unit 510 includes a separate processor. In some embodiments, the calibration unit 510 may leverage processor 502. The calibration unit 510 may be implemented using hardware components of the apparatus configured by either hardware or software for implementing the functions described herein.

Figure 10:
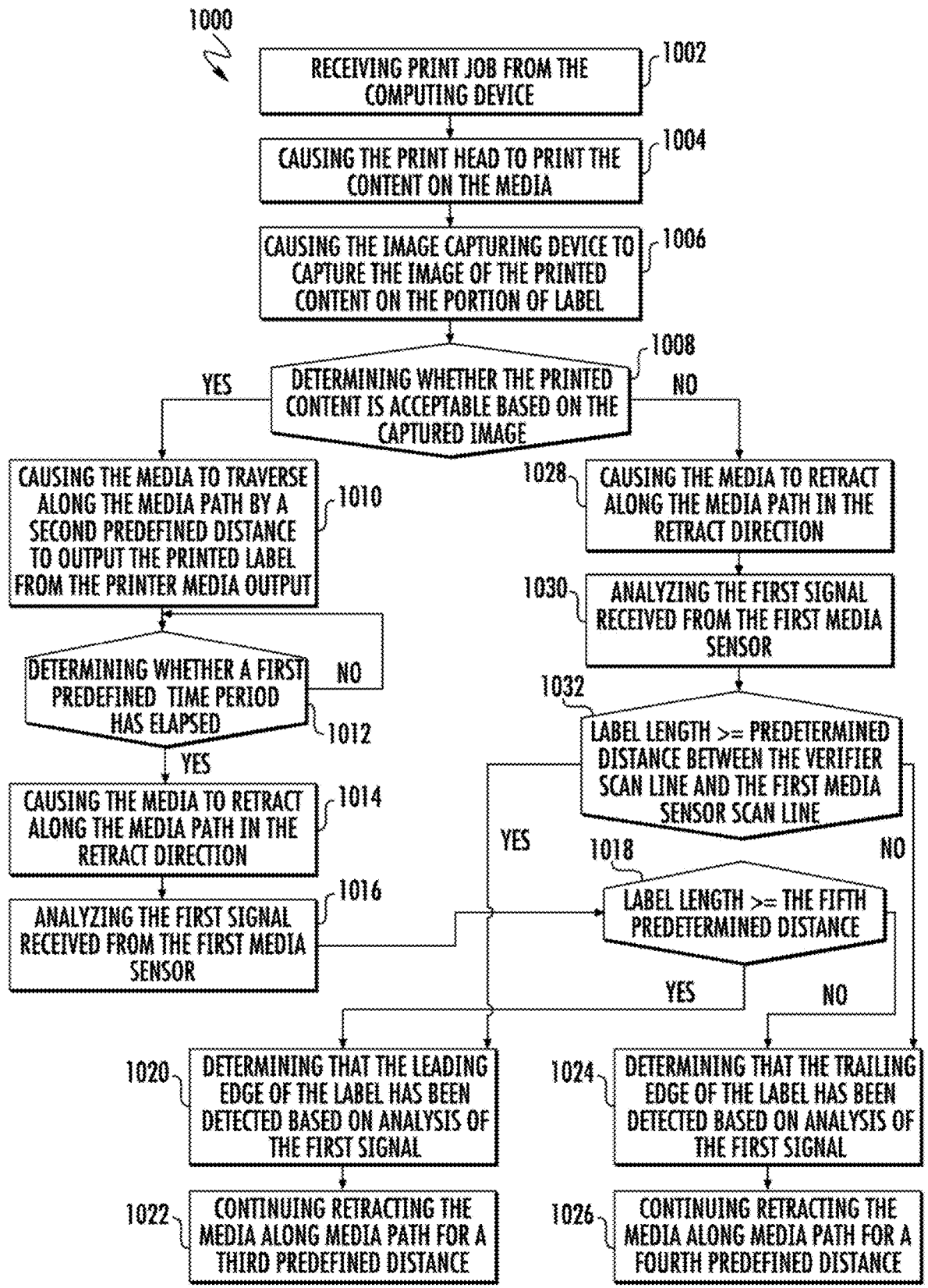
FIG. 10 illustrates a flowchart for operating the printer apparatus in a print mode, according to one or more embodiments described herein.

The print operation unit 512 may include suitable logic and/or circuitry that may cause the printer apparatus 100 to perform a print operation, as is further described in conjunction with FIG. 10. In an example embodiment, the print operation unit 512 may be configured to receive the print job from the computing device. Thereafter, the print operation unit 512 may be configured to perform the print operation based on the print job. For instance, during the print operation, the print operation unit 512 may be configured to instruct the I/O device interface unit 508 to actuate the first electrical drive, the second electrical drive, and the third electrical drive, which are associated with the media hub 102, the ribbon drive assembly 106, and ribbon take-up hub 108, respectively, to cause the traversal of the media 116 and the ribbon 122 along the media path 118 and the ribbon path 124, respectively. Further, the print operation unit 512 may be configured to control the operation of the print head 110 (for example energization of the one or more heating elements and the vertical translation of the print head 110) to perform the print operation. In some embodiments, the print operation unit 512 includes a separate processor. In some embodiments, the print operation unit 512 may leverage processor 502. The print operation unit 512 may be implemented using hardware components of the apparatus configured by either hardware or software for implementing the functions described herein.

The signal processing unit 514 may include suitable logic and/or circuitry for analyzing the first signal and the second signal received from the first media sensor 202 and the second media sensor 204, respectively. In an example embodiment, the signal processing unit 514 may include a digital signal processor that may be configured to analyze the first signal and the second signal to determine one or more measurements of one or more characteristics of the first signal and the second signal, as is described in FIGS. 7 and 8. In an example embodiment, the one or more characteristics of the first signal and the second signal may include, but are not limited to, an amplitude and a frequency of the first signal and the second signal. Further, the signal processing unit 514 may utilize one or more signal processing techniques such as, but not limited to, Fast Fourier Transform (FFT), Discrete Fourier Transform (DFT), Discrete Time Fourier Transform (DTFT) to analyze the first signal and the second signal. In some embodiments, the signal processing unit 514 includes a separate processor. In some embodiments, the signal processing unit 514 may leverage processor 502. The signal processing unit 514 may be implemented using hardware components of the apparatus configured by either hardware or software for implementing the functions described herein.

The image processing unit 516 may include suitable logic and/or circuitry for receiving the image of the printed content from the image capturing device 216 in the image verifier housing 112. In an example embodiment, the image processing unit 516 may be configured to verify the printed content based on the captured image of the printed content, as is further described in conjunction with FIG. 10. In some embodiments, the image processing unit 516 includes a separate processor. In some embodiments, the image processing unit 516 may leverage processor 502. The image processing unit 516 may be implemented using hardware components of the apparatus configured by either hardware or software for implementing the functions described herein.

The media alignment unit 518 may include suitable logic and/or circuitry for aligning the media 116 with the print head 110, as is further described in conjunction with FIG. 10. More particularly, the media alignment unit 518 may be configured to align one of plurality of labels 117 with the print head 110, as is further described in conjunction with FIG. 10. Additionally, the media alignment unit 518 may be further configured to update the length of the plurality of labels 117 when a new media roll is installed in the printer apparatus 100, as is further described in conjunction with FIG. 12. In some embodiments, the media alignment unit 518 includes a separate processor. In some embodiments, the media alignment unit 518 may leverage processor 502. The media alignment unit 518 may be implemented using hardware components of the apparatus configured by either hardware or software for implementing the functions described herein.

In some examples, the scope of the disclosure is not limited to the control system 206 comprising the aforementioned components and/or units. In an example embodiment, some of the components may be implemented in other components of the printer apparatus 100. For example, the image processing unit 516 may be implemented in the image capturing device 216 (in the image verifier housing 112). Similarly, in some examples, the signal processing unit 514 may be implemented in the first media sensor 202 or the second media sensor 204, without departing from the scope of the disclosure.

FIGS. 6-7, 9-10, and 12 illustrate example flowcharts of the operations performed by an apparatus, such as the printer apparatus 100 as shown in FIGS. 1A-1C and the direct thermal printer 300 as shown in FIGS. 3A-3B in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 6-7, 9-10, and 12, when executed, convert a computer or processing circuitry into a particular machine configured to perform an example embodiment of the present invention. Accordingly, the operations of FIGS. 6-7, 9-10, and 12 define algorithms for configuring a computer or processor, to perform an example embodiment. In some cases, a general purpose computer may be provided with an instance of the processor which performs the algorithm of FIGS. 6-7, 9-10, and 12 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

Figure 6:
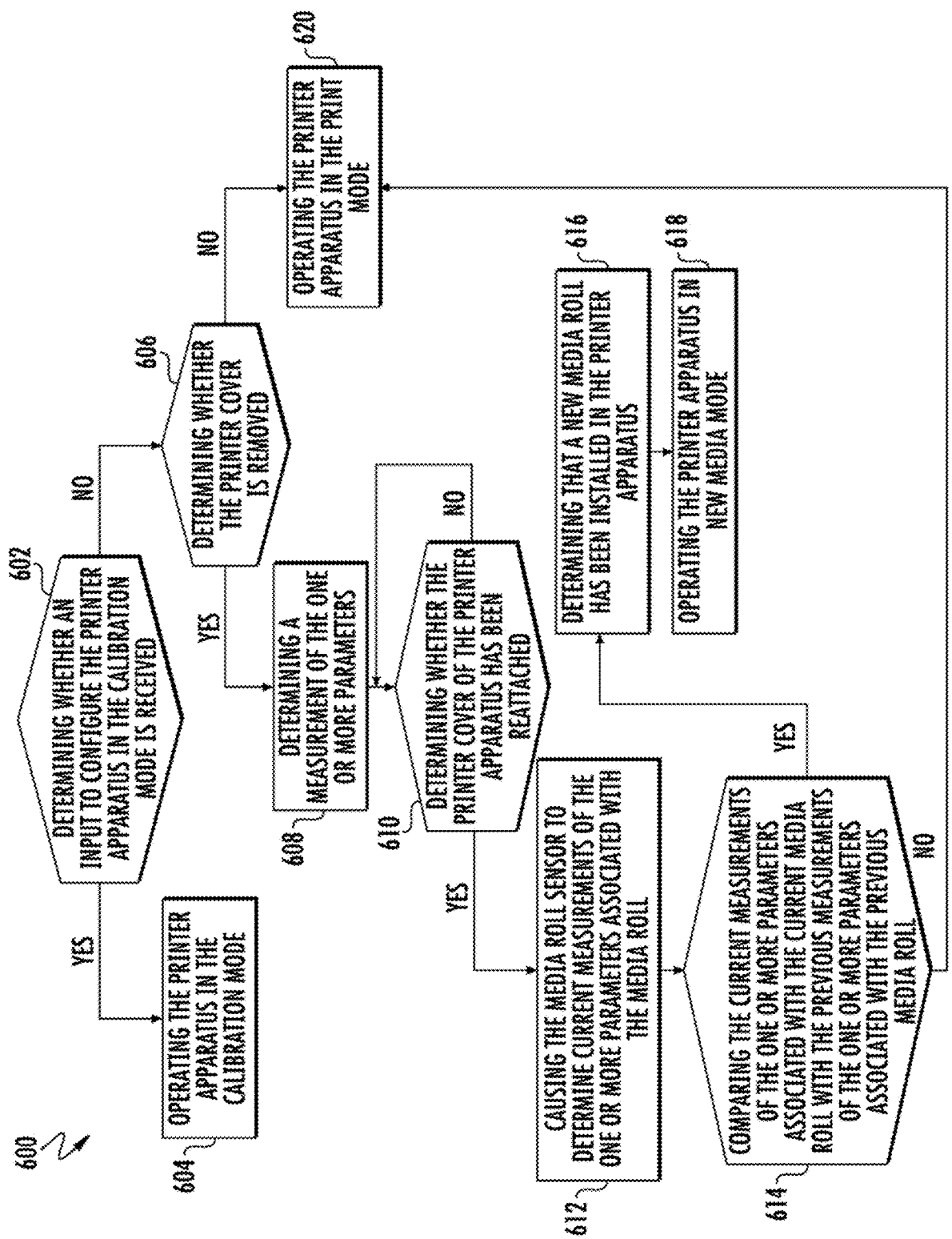
FIG. 6 illustrates a flowchart for operating the printer apparatus, according to one or more embodiments described herein.

FIG. 6 illustrates a flowchart 600 for operating the printer apparatus 100, according to one or more embodiments described herein.

At step 602, the printer apparatus 100 includes means, such as the control system 206, the processor 502, the I/O device interface unit 508, and/or the like, for determining whether an input to configure the printer apparatus 100 in the calibration mode is received. In some embodiments, a user of the printer apparatus 100 may provide the input (corresponding to operating the printer apparatus 100 in the calibration mode) by pressing one or more buttons provided on an input panel of the printer apparatus 100 in a predetermined pattern. In an example embodiment, the predetermined pattern may correspond to pressing the button in a predetermined sequence or for a predetermined time duration. For example, the user may keep a button pressed for 10 seconds. In some example embodiments, the predetermined pattern may be pre-configured during manufacturing of the printer apparatus 100.

If the I/O device interface unit 508 determines that the input to configure the printer apparatus 100 in the calibration mode is received, the processor 502 may be configured to perform step 604. At step 604, the printer apparatus 100 includes means, such as the control system 206, the processor 502, the calibration unit 510, and/or the like, for operating the printer apparatus 100 in the calibration mode. The operation of the printer apparatus 100 in the calibration mode is further described in conjunction with FIG. 7.

However, if at step 602, the I/O device interface unit 508 determines that the input to configure the printer apparatus 100 in the calibration mode is not received, the processor 502 may be configured to perform step 606. At step 606, the printer apparatus 100 includes means, such as the control system 206, the processor 502, the I/O device interface unit 508, and/or the like, for determining whether the printer cover is removed. In an example embodiment, the I/O device interface unit 508 may be configured to monitor the signal received from the printer cover sensor 113 to determine whether the printer cover sensor 113 is in the pressed state or in the released state. As described, the printer cover sensor 113 is in pressed state when the cover is attached to the printer apparatus 100. Further, in the pressed state, the printer cover sensor 113 generates the signal. As described, the printer cover sensor 113 is in the released state when the cover is removed from the printer apparatus 100. In the released state, the printer cover sensor 113 halts the generation of the signal.

Accordingly, at step 606, the I/O device interface unit 508 determine whether the cover is attached to the printer apparatus 100 based on the reception of the signal from the printer cover sensor 113. For example, when the I/O device interface unit 508 receives the signal, the I/O device interface unit 508 determines that the printer cover is attached to the printer apparatus 100, and may be configured to perform step 620. If the I/O device interface unit 508 does not receives the signal from the printer cover sensor 113, the I/O device interface unit 508 determines that the printer cover has been removed from the printer apparatus 100, and may be configured to perform step 608.

At step 608, the printer apparatus 100 includes means, such as the control system 206, the processor 502, the I/O device interface unit 508, and/or the like, for determining a measurement of the one or more parameters associated with the media roll 114. As described, the one or more parameters associated with the media roll 114 includes the weight of the media roll 114, the diameter of the media roll 114, and the rpm with which the media hub 102 rotates to supply the media 116 on the media path 118.

In some embodiments, the I/O device interface unit 508 may cause the media roll sensor 103 to determine the measurements of the one or more parameters associated with the media roll 114 when the cover of the printer apparatus 100 is removed. For example, the I/O device interface unit 508 may cause the media roll sensor 103 to determine the measurement of the weight of the media roll 114 and the diameter of the media roll 114 when the cover of the printer apparatus 100 is removed. Further, the I/O device interface unit 508 may be configured to store the measurements of the weight of the media roll 114 and the diameter of the media roll 114 in the memory device 504 as previous measurements of the one or more parameters associated with the media roll 114. In some embodiments, the I/O device interface unit 508 may be configured to store the last known measurements of the one or more parameters associated with the media roll 114 in the memory device 504 as the previous measurements of the one or more parameters associated with the media roll 114.

In some embodiments, the last known measurements of the one or more parameters associated with the media roll 114 may correspond to measurements determined at a time instant prior to removal of the printer cover. For example, the I/O device interface unit 508 may have caused the media roll sensor 103 to determine the measurements of the one or more parameters associated with the media roll 114 prior to removal of the printer cover, such as during execution of a print job.

At step 610, the printer apparatus 100 includes means, such as the control system 206, the processor 502, the I/O device interface unit 508, and/or the like, for determining whether the printer cover of the printer apparatus 100 has been reattached. In an example embodiment, the I/O device interface unit 508 may utilize similar methodology as is described in step 606 to determine whether the cover has been reattached to the printer apparatus 100. For example, the I/O device interface unit 508 may determine that the cover is attached to the printer apparatus 100 based on the reception of the signal from the printer cover sensor 113. If the I/O device interface unit 508 determines that the cover is attached to the printer apparatus 100, the I/O device interface unit 508 may be configured to perform step 612. However, if the I/O device interface unit 508 determines that the cover is not attached to the printer apparatus 100, the I/O device interface unit 508 may be configured to repeat step 610.

At step 612, the printer apparatus 100 includes means, such as the control system 206, the processor 502, the I/O device interface unit 508, and/or the like, for causing the media roll sensor 103 to determine current measurements of the one or more parameters associated with the media roll 114.

At step 614, the printer apparatus 100 includes means, such as the control system 206, the processor 502, the I/O device interface unit 508, and/or the like, for comparing the current measurement(s) of the one or more parameters associated with the current media roll with the previous measurement(s) of the one or more parameters associated with the previous media roll (retrieved from the memory device 504) to determine whether they are different. For example, the I/O device interface unit 508 may determine the current measurement of the weight of the media roll as 250 gm, and retrieves the previous weight of the media roll as 100 gm. Therefore, based on the comparison, the I/O device interface unit 508 may determine that the weight of the media roll 114 has increased. Accordingly, the I/O device interface unit 508 determines that the current measurements of the one or more parameters associated with the media roll 114 are different from the previous measurements of the one or more parameters associated with the media roll 114.

If, at step 614, the I/O device interface unit 508 determines that the current measurement(s) of the one or more parameters associated with the media roll 114 are different from the previous measurement(s) of the one or more parameters associated with the media roll 114, the I/O device interface unit 508 may be configured to perform step 616. However, if the I/O device interface unit 508 determines that the current measurements of the one or more parameters associated with the media roll 114 are not different from the previous measurements of the one or more parameters associated with the media roll 114, the I/O device interface unit 508 may be configured to perform step 620.

At step 616, the printer apparatus 100 includes means, such as the control system 206, the processor 502, the I/O device interface unit 508, the media alignment unit 518, and/or the like, for determining that a new media roll has been installed in the printer apparatus 100. Accordingly, at 618, the printer apparatus 100 includes means, such as the control system 206, the processor 502, the I/O device interface unit 508, the media alignment unit 518, and/or the like, for operating the printer apparatus 100 in the new media mode. The operation of the printer apparatus 100 in the new media mode is described in conjunction with FIG. 12.

At step 620, the printer apparatus 100 includes means, such as the control system 206, the processor 502, the print operation unit 512, and/or the like, for operating the printer apparatus 100 in the print mode. The operation of the printer apparatus 100 in the print mode is described in conjunction with FIG. 10.

FIG. 7 illustrates a flowchart 700 of a method for operating the printer apparatus 100 in the calibration mode, according to one or more embodiments described herein.

At step 702, the printer apparatus 100 includes means, such as the control system 206, the processor 502, the calibration unit 510, the I/O device interface unit 508, and/or the like, for causing the media 116 to traverse along the media path 118 in the print direction. In an example embodiment, the calibration unit 510 may be configured to instruct the I/O device interface unit 508 to actuate the first electrical drive associated with the media hub 102 and the platen roller 207. The actuation of the first electrical drive causes the media hub 102 and the platen roller 207 to rotate, which in turn causes the media roll 114 to supply the media 116 along the media path 118. As the media 116 traverses along the media path 118, the media 116 also traverses with respect to the first media sensor 202 and the second media sensor 204.

In some examples, the I/O device interface unit 508 may be configured to actuate the first electrical drive at a predetermined angular velocity. In an example embodiment, the actuation of the first electrical drive at the predetermined angular velocity causes the media 116 to traverse along the media path 118 at a determined linear speed. In an example embodiment, the calibration unit 510 may be configured to store the predetermined angular velocity of the first electrical drive and the determined linear speed of the media 116 in the memory device 504.

At step 704, the printer apparatus 100 includes means, such as the control system 206, the processor 502, the calibration unit 510, the I/O device interface unit 508, and/or the like, for receiving the second signal from the second media sensor 204 while the media 116 traverses along the media path 118. As described above, the second signal corresponds to the voltage signal that is representative of the measurement of the transmissivity/reflectivity of the media 116 as the media 116 traverses along the media path 118 in the print direction. Further, as described above, the transmissivity/reflectivity of the media 116 is determined based on the intensity of the portion of the light signal reflected from the surface of the media 116 or transmitted through the media 116. Therefore, the second signal generated by the second media sensor 204 is representative of the intensity of the portion of the light signal received by the second media sensor 204. More specifically, the one or more characteristics of the second signal (such as the amplitude of the second signal and the frequency of the second signal) are representative of the intensity of the portion of the light signal received by the media sensor 204. For example, if the intensity of the portion of light signal received by the second media sensor 204 at a first time instant is greater than the intensity of the portion of the light signal received by the second media sensor 204 at a second time instant, the amplitude of the second signal generated by the second media sensor 204 at the first time instant is greater than the intensity of the second signal generated by the second media sensor 204 at the second time instant.

In an example embodiment, as the media 116 traverses along the media path 118, different sections of the media 116 passes over the second media sensor 204. Accordingly, the measure of the transmissivity/reflectivity varies as the media 116 traverses along the media path 118. Further, as described above, the media 116 has the plurality of labels 117 that has the leading edge 119a and the trailing edge 119b (i.e., defined by the one or more perforations and/or the one or more marks). When such marks/perforations pass over the second media sensor 204 while the media 116 traverses along the media path 118, the second media sensor 204 may sense a sudden increase in the intensity of the light signal or a sudden decrease in the intensity of the light signal, received by the light receiver of the second media sensor 204. Accordingly, the second media sensor 204 generates the second signal that may be indicative of such variations in received light signals. For example, such sudden increase in the intensity of the received light signal may be depicted by a peak in the second signal (i.e., a spike in the amplitude of the second signal). In another example, the sudden decrease in the intensity of the light signal may be depicted by a valley in the second signal. One such example second signal is described in conjunction with FIG. 8.

Figure 8:
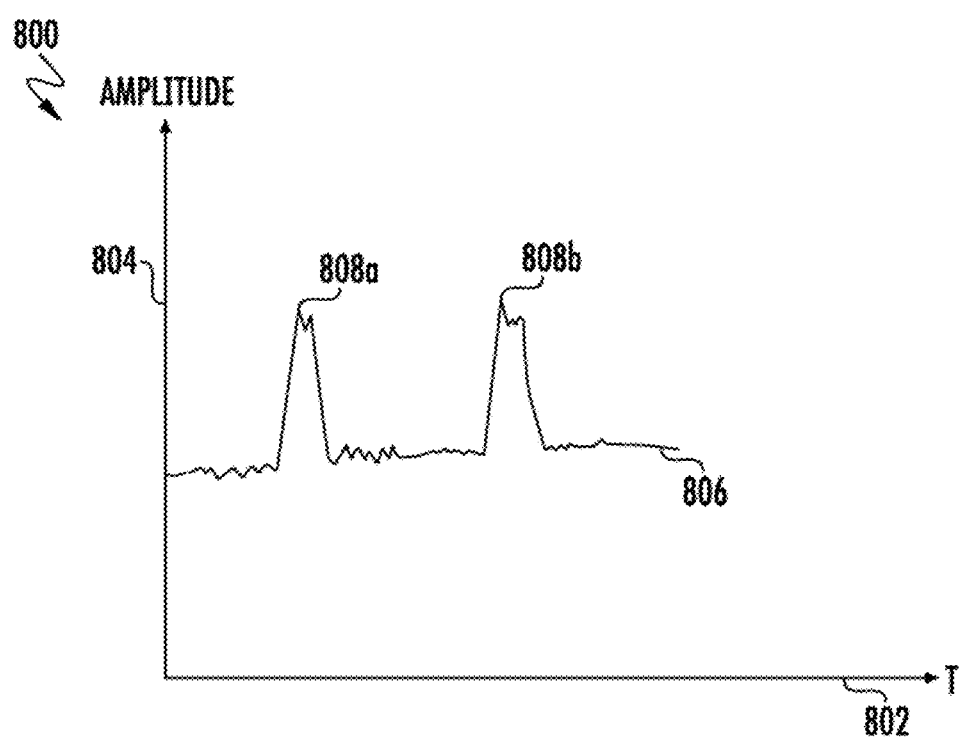
FIG. 8 illustrates a graphical representation of an example second signal, according to one or more embodiments described herein.

FIG. 8 illustrates a graphical representation 800 of an example second signal, according to one or more embodiments described herein.

The graphical representation 800 includes an X-axis 802 and a Y-axis 804. The X-axis 802 represents the time duration for which the example second signal is received. The Y-axis 804 represents a measure of amplitude of the example second signal. The curve 806 represents the variation in the measurement of the amplitude of the example second signal. For example, the curve 806 has various peaks such as 808a and 808b. The peak 808a and the peak 808b are chronologically spaced apart from each other. Further, the peaks 808a and 808b depict sudden increase in the measure of transmissivity of the media 116 as the media 116 traverses along the media path 118. As described, the sudden increase in the measure of transmissivity of the media 116 is due to, for example, passing of a perforation (e.g., the leading edge or the trailing edge of the label (e.g., 117a)) on the media 116 over the second media sensor 204. Therefore, the peaks 808a and 808b may represent that the perforations on the media 116 may have traversed over the second media sensor 204, as the media 116 traverses along the media path 118.

Further, as described above, the perforations are utilized to divide the media 116 in the plurality of labels 117, and each label of the plurality of labels 117 has two perforations that are utilized to define the two edges of the label (i.e., the leading edge 119a and the trailing edge 119b). Therefore, in some examples, when the perforation passes over the second media sensor 204, either the leading edge 119a or the trailing edge 119b associated with the label (e.g., 117a) of the plurality of labels 117 may have traversed over the second media sensor 204. Accordingly, the peaks 808a and 808b may depict the leading edge 119a and the trailing edge 119b of the label 117a, respectively.

Referring back to FIG. 7, at step 706, the printer apparatus 100 includes means, such as the control system 206, the processor 502, the calibration unit 510, the signal processing unit 514, and/or the like, for determining the length of the plurality of labels 117 in the media 116 based on the received second signal. The determination of the length of the plurality of labels 117 is further described in conjunction with FIG. 9.

Figure 9:
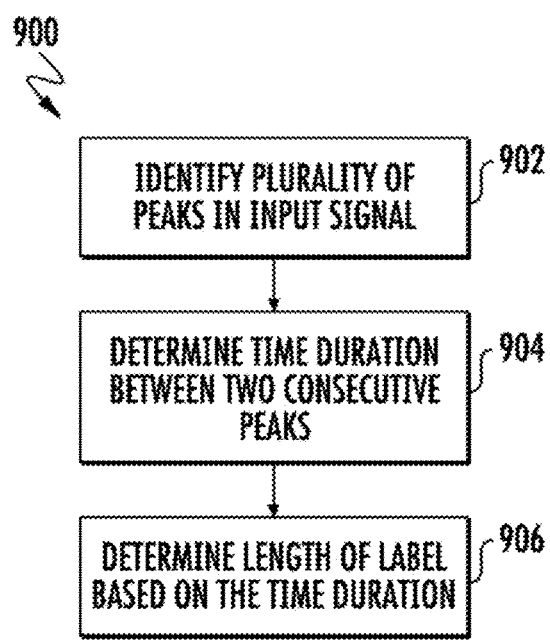
FIG. 9 illustrates a flowchart of a method for determining a length of a plurality of labels, according to the one or more embodiments described herein.

FIG. 9 illustrates a flowchart 900 of a method for determining the length of the plurality of labels 117, according to the one or more embodiments described herein.

At step 902, the printer apparatus 100 includes means, such as the control system 206, the processor 502, the signal processing unit 514, and/or the like, for identifying a plurality of peaks in the second signal (received in the step 704). In an example embodiment, the signal processing unit 514 may be configured to utilize one or more signal processing techniques to identify the plurality of peaks in the received second signal, including, but are not limited to, running averages, signal smoothening, wavelet transformation, and/or the like. As described above, the plurality of peaks in the second signal may be representative the sudden increase in the measure of transmissivity of the media 116, and the sudden increase in the measure of transmissivity of the media 116 indicates that either the leading edge or the trailing edge of the label of plurality of labels 117 has traversed over the second media sensor 204 during the traversal of the media 116 along the media path 118.

At step 904, the printer apparatus 100 includes means, such as the control system 206, the processor 502, the signal processing unit 514, and/or the like, for determining a time duration between two consecutive peaks in the second signal. As described above, the plurality of peaks represents either the leading edge or the trailing edge (defined by the perforations) of plurality of labels 117, and a contiguous stretch of the media 116 between two consecutive perforations corresponds to the label 117a in the media 116. Accordingly, the time duration between the two consecutive peaks may correspond to a time period that the label 117a took to traverse past the second media sensor 204 during traversal of the media 116 along the media path 118.

At step 906, the printer apparatus 100 includes means, such as the control system 206, the processor 502, the calibration unit 510, and/or the like, for determining the length of the label 117a based on the determined time duration between the two consecutive peaks and the determined linear speed of media traversal along the media path 118. As described above, during calibration, the I/O device interface unit 508 causes the media to traverse along the media path 118 at the determined linear speed (by rotating the media roll 114 at the predetermined angular velocity). Therefore, in an example embodiment, the calibration unit 510 may utilize the relationship between the speed and time to determine the length of the label 117a. Further, the calibration unit 510 may be configured to store the determined length of the label 117a in the memory device 504 as original label length.

In some embodiments, the scope of the disclosure is not limited to determining the original label length as is described in conjunction with FIG. 9. In an example embodiment, other methods can be utilized to determine the original label length of the plurality of labels 117, without departing from the scope of the disclosure.

In some embodiments, the scope of the disclosure is not limited to the calibration unit 510 utilizing the second signal, received from the second media sensor 204, to determine the original label length of the plurality of labels 117. In an example embodiment, the calibration unit 510 may be configured to utilize the first signal received from the first media sensor 202 to determine the original label length of the plurality of labels 117. In an example embodiment, the calibration unit 510 may utilize the methodologies described in the flowchart 900 to determine the original label length based on the first signal.

FIG. 10 illustrates a flowchart 1000 for operating the printer apparatus 100 in the print mode, according to one or more embodiments described herein.

At step 1002, the printer apparatus 100 includes means, such as the control system 206, the processor 502, the communication interface 506, the print operation unit 512, and/or the like, for receiving a print job from the computing device. In an example embodiment, the print operation unit 512 may receive the print job through the communication interface 506. In some examples, the print job may include information pertaining to the content to be printed on the media 116. Further, the print job may include information pertaining to a location on the media 116 where the content is to be printed. For instance, the print job may include information pertaining to the coordinates on the label 117a where the content is to be printed. Further, on receiving the print job, the print operation unit 512 may be configured to store the content to be printed in the memory device 504 as reference content.

At step 1004, the printer apparatus 100 includes means, such as the control system 206, the processor 502, the print operation unit 512, the I/O device interface unit 508, and/or the like, for causing the print head 110 to print the content on the media 116. For example, the print operation unit 512 may cause the print head 110 to print content on the label 117a. In an example embodiment, prior to printing the content on the label 117a, the print operation unit 512 may be configured to align a printable portion on the label 117a with the burn line 208.

In some examples, the printable portion of the label 117a may correspond to a region on the label 117a where the content is printable. In some examples, the printable portion of the label 117a may located at a distance from the leading edge 119a and the trailing edge 119b. For example, the printable portion of the label 117a is located at the distance of 0.5 mm from the leading edge of the label 117a. In some examples, such distance from the leading edge 119a of the label 117*a* may be inputted by the user of the printer apparatus 100. In an example embodiment, the user of the printer apparatus 100 may input the value of the distance through the computing device. In an alternative embodiment, the user may input the value of the distance from the leading edge 119*a* of the label 117*a* while creating the print job to be executed on the printer apparatus 100.

To align the printable portion of the label 117*a* with the burn line 208, the I/O device interface unit 508 may cause the media hub 102 to rotate, which in turn causes the media 116 to traverse along the media path 118 by a first distance. In an example embodiment, the I/O device interface unit 508 may determine the first distance based on the label length and the sixth predetermined distance 230 between the burn line 208 and the second media sensor scan line 226 as shown in FIG. 2A. For example, if the sixth predetermined distance is 50 mm and the label length is 10 mm, the I/O device interface unit 508 may determine that the count of labels of the plurality of labels 117 between the second media sensor scan line 226 and the burn line 208 is 5. When a leading edge of a label (for example, a label X) of the plurality of labels 117 aligns with the second media sensor scan line 226, the I/O device interface unit 508 determines that the 5$^{th}$ label from the label X has a leading edge aligned with the burn line 208. Thereafter, the I/O device interface unit 508 may cause the media 116 to move in the print direction by the distance of, for example 0.5 mm based on user input, to align the printable portion with the burn line.

In an example embodiment, the print operation unit 512 may cause the print head 110 to heat one or more heating elements of the plurality of heating elements based on the content to be printed and the coordinates on the label 117*a* to print the content. For example, if the content corresponds to a margin to be printed on a periphery of the label 117*a*, the print operation unit 512 may cause the print head 110 to heat the one or more heating elements at the corners of the burn line 208 in order to print margins on the label 117*a*.

Concurrently, the I/O device interface unit 508 may cause the media 116 to traverse along the media path 118 in the print direction. As the media 116 continues traversal along the media path 118 in the print direction, after a time duration (since the printing operation was initiated), a portion of the label 117*a* (on which the content is being printed) moves to the location corresponding to the verifier scan line 218. In an example embodiment, such a scenario occurs when the label length of the plurality of labels 117 is greater than the second predetermined distance 232 between the burn line 208 and the verifier scan line 218 as shown in FIG. 2A.

In certain implementations, where the label length of the plurality of labels 117 is less than the second predetermined distance 232 between the burn line 208 and the verifier scan line 218, the I/O device interface unit 508 causes the media 116 to traverse along the media path 118 in the print direction after the printing of the content on the label 117*a* is complete.

At step 1006, the printer apparatus 100 includes means, such as the control system 206, the processor 502, the print operation unit 512, the image processing unit 516, and/or the like, for causing the image capturing device 216 to capture the image of the printed content on the portion of label 117*a*. After the image capturing device 216 captures the image of the printed content on the portion of the label 117*a*, the image processing unit 516 receives the captured image from the image capturing device 216.

At step 1008, the printer apparatus 100 includes means, such as the control system 206, the processor 502, the print operation unit 512, the image processing unit 516, and/or the like, for determining whether the printed content is acceptable based on the captured image. To determine whether the printed content is acceptable, in an example embodiment, the image processing unit 516 may be configured to compare the captured image (i.e., the image of the portion of the label 117*a*) with the reference content (stored in the memory device 504 in the step 1002). As described, the reference content corresponds to the content received in the print job. Therefore, based on the comparison, the image processing unit 516 determines whether the content received from the print job is correctly reproduced on the portion of the label 117*a*. For example, the image processing unit 516 may compare the image of the portion of the label 117*a* with corresponding reference content to determine whether the content received in the print job is correctly reproduced on the label 117*a*. In some examples, image processing unit 516 may compare the image of portion of the label 117*a* and the corresponding reference content based on the type of the reference content. Some examples of reference content types may include, but are not limited to, an indicia, a text content, an image, etc.

For example, if the type of reference content corresponds to an indicia (such as a barcode), the image processing unit 516 may be configured to decode the barcode from the captured image. Further, the image processing unit 516 may be configured to decode the barcode from the reference content. Thereafter, the image processing unit 516 may be configured to determine whether the decoded information obtained from the captured image is same as the decoded information received from the reference content. If the decoded information obtained from both the reference content and the captured image are the same, the image processing unit 516 determines that the printed content is acceptable. However, if the decoded information obtained from the reference content and the captured image are not the same, the image processing unit 516 may determine that the printed content is not acceptable.

In another example, if the type of the reference content is text content, the image processing unit 516 may configured to perform Optical Character Recognition (OCR) on the captured image to obtain text. Thereafter, the image processing unit 516 may compare the text from the reference content with the text obtained through OCR to determine whether the reference content is correctly reproduced on the label 117*a*. If the image processing unit 516 determines that the reference content is correctly reproduced on the label 117*a*, the image processing unit 516 determines that the printed content is acceptable.

After determining that the printed content on the portion of the label 117*a* is acceptable, the image processing unit 516 may be configured to determine whether the printed content is acceptable at the remaining portions of the label 117*a* using the methods described in the step 1008. In some examples, after the image processing unit 516 determines that printed content on all portions of the label 117*a* is acceptable, the location of the label 117*a* with respect to the verifier scan line 218 is such that the trailing edge 119*b* of the label 117*a* aligns with the verifier scan line 218. In other words, all portions of the label 117*a* has passed through the verifier scan line 218 for the image processing unit 516 to determine whether the printed content is acceptable, resulting in the trailing edge 119*b* of the label 117*a* aligning with the verifier scan line 218.

In an example embodiment, if the image processing unit 516 determines that the printed content is acceptable, the image processing unit 516 may be configured to perform step 1010. However, if the image processing unit 516 determines that the printed content is not acceptable (in other words, the verification of the printed content fails), the image processing unit 516 may be configured to perform step 1014.

At step 1010, the printer apparatus 100 includes means, such as the control system 206, the processor 502, the print operation unit 512, the I/O device interface unit 508, and/or the like, for causing the media 116 to traverse in the print direction along the media path 118 by a second distance to output the printed label 117a from the printer media output 104. In an example embodiment, the I/O device interface unit 508 may be configured to determine the second distance based on the label length and the third predetermined distance 234 between the verifier scan line 218 and the printer media output 104.

For example, after the verification of the printed content on the label 117a is complete, the trailing edge of the label 117a aligns with the verifier scan line 218, as described above. If the third predetermined distance 234 is 10 mm and the label length is 15 mm, to output the printed label out of the printer media output 104, the I/O device interface unit 508 may be configured to cause the media 116 to traverse by the second distance of 10 mm (which is the third predetermined distance). When the label 117a (having the printed content) is outputted from the printer media output 104, a portion of the label 117b (adjacent to the label 117a) also travels in the print direction by the second distance. Therefore, the label 117b, on which the content is to be printed next, is misaligned with respect to the print head 110.

At step 1012, the printer apparatus 100 includes means, such as the control system 206, the processor 502, the print operation unit 512, and/or the like, for determining whether a first predefined time period has elapsed. In some examples, the first predefined time period may correspond to a time duration within which the user of the printer apparatus 100 has to tear off the label on which the content has been printed (for example, label 117a) by utilizing a tear bar (not shown) in the printer apparatus 100. If the print operation unit 512 determines that the first predefined time period has elapsed, the print operation unit 512 performs step 1014. However, if the print operation unit 512 determines that the first predefined time period has not elapsed, the print operation unit 512 may be configured to repeat step 1012.

Additionally or alternatively, the print operation unit 512 may determine whether the label on which the content has been printed has been torn off through sensor(s). In an example embodiment, the print operation unit 512 may be configured to determine whether the label has been torn off based on reception of the media presence signal (generated by the media output sensor 121). When the print operation unit 512 stops receiving the media presence signal, the print operation unit 512 determines that the label has been torn off. Accordingly, the print operation unit 512 may be configured to perform the step 1014. However, of the print operation unit 512 determines that it is still receiving the media presence signal, the print operation unit 512 determines that the printed label has not been torn off. Accordingly, the print operation unit 512 may repeat the step 1012.

At step 1014, the printer apparatus 100 includes means, such as the control system 206, the processor 502, the print operation unit 512, I/O device interface unit 508, and/or the like, for causing the media 116 to retract along the media path 118 in the retract direction. In an example embodiment, the print operation unit 512 may instruct the I/O device interface unit 508 to cause the media 116 to retract along the media path 118. For example, on receiving the instruction, the I/O device interface unit 508 may be configured to actuate the first electrical drive to cause the media 116 to retract.

At step 1016, the printer apparatus 100 includes means, such as the control system 206, the processor 502, the print operation unit 512, I/O device interface unit 508, the signal processing unit 514, and/or the like, for analyzing the first signal received from the first media sensor 202 while media 116 retracts along the media path 118 to detect the sudden increase or decrease in the measurement of the transmissivity/reflectivity of the media 116. As described, the first signal is indicative of the measurement of the transmissivity/reflectivity of various sections of the media 116. As the label 117b passing over the first media sensor 202 during the retraction of the media 116 along the media path 118, the first signal generated by the first media sensor 202 is indicative of the measurements of the transmissivity/reflectivity of the various sections of the label 117b. Further, as described, when either the leading edge 119b or the trailing edge 119c of the label 117b passes over the first media sensor 202, the first media sensor 202 may record a sudden increase or decrease in the transmissivity/reflectivity of the media 116, as indicated in the one or more measurements of the one or more characteristics of the first signal (generated by the first media sensor 202). Therefore, the signal processing unit 514 may be configured to analyze the first signal to detect such sudden increase or decrease in the measurement of the transmissivity/reflectivity of the media 116. Upon detection of the sudden increase or decrease in the measurement of the transmissivity/reflectivity of the media 116, the signal processing unit 514 may determine that the either the leading edge or the trailing edge of the label 117b has traversed over the first media sensor 202 during traversal of the media 116 in the retract direction.

At step 1018, the printer apparatus 100 includes means, such as the control system 206, the processor 502, the print operation unit 512, I/O device interface unit 508, signal processing unit 514 and/or the like, for determining whether the label length of the plurality of labels 117 (as determined in, for example, step 906 of FIG. 9) is greater than or equal to the fifth predetermined distance 238 between the first media sensor scan line 224 and the printer media output 104. If the I/O device interface unit 508 determines that the length of the plurality of labels 117 is greater than or equal to the fifth predetermined distance 238, the signal processing unit 514 may be configured to perform step 1020. However, if the I/O device interface unit 508 determine that the length of the plurality of labels 117 is less than the fifth predetermined distance 238, the signal processing unit 514 may be configured to perform step 1024.

In some embodiments, the determination at the step 1018 enables the signal processing unit 514 to determine whether the sudden increase/decrease in the measurement of the transmissivity/reflectivity of the media 116 is due to the leading edge 119b or the trailing edge 119c of the label 117b traversing over the first media sensor 202. For example, if the length of the label 117b is less than fifth predetermined distance 238, the complete label 117b would have traversed past the first media sensor scan line 224 during the execution of the step 1010. Accordingly, the sudden increase/decrease in the measurement of the transmissivity/reflectivity of the media 116 the during retraction of the media 116 may be due to the trailing edge of the label 117b traversing over the first media sensor 202. If the length of the label 117b is greater than the fifth predetermined distance 238, only a portion of the label 117b would have traversed past the first media during the execution of the step 1010. Accordingly, the sudden increase/decrease in the measurement of the transmissivity/reflectivity of the media 116 may be due to the leading edge of the label 117b traversing past the first media sensor 202.

At step 1020, the printer apparatus 100 includes means, such as the control system 206, the processor 502, the print operation unit 512, I/O device interface unit 508, signal processing unit 514 and/or the like, for determining that the leading edge 119b of the label (e.g., 117b) has been detected based on the analysis of the first signal at step 1016 while the media retracts along the media path at step 1014. Accordingly, at step 1022, the printer apparatus 100 includes means, such as the control system 206, the processor 502, the print operation unit 512, I/O device interface unit 508, and/or the like, for continuing retracting the media 116 along media path 118 for a third distance so that the leading edge 119b of the label 117b is aligned with the burn line. In some embodiments, the third distance corresponds to the fourth predetermined distance 228 as shown in FIG. 2A.

In some embodiments, the third distance may correspond to a distance determined based on the fourth predetermined distance 228 minus the distance of the printable portion from the leading edge. In such an embodiment, the I/O device interface unit 508 may be configured to determine the third distance. Further, in such an embodiment, the burn line 208 aligns with the printable portion on the label 117b.

At step 1024, the printer apparatus 100 includes means, such as the control system 206, the processor 502, the print operation unit 512, the I/O device interface unit 508, the signal processing unit 514 and/or the like, for determining that the trailing edge 119c of the label 117b has been detected based on the analysis of the first signal at step 1016 while the media retracts along the media path at step 1014. Accordingly, at step 1026, the printer apparatus 100 includes means, such as the control system 206, the processor 502, the print operation unit 512, I/O device interface unit 508, and/or the like, for continuing retracting the media 116 along media path 118 for a fourth distance. In example embodiment, the fourth distance corresponds to a sum of the fourth predetermined distance 228 and the length of the plurality of labels 117. In such an embodiment, when the I/O device interface unit 508 causes the media to retract by the fourth distance, the leading edge of the label 117b is aligns with the burn line after retraction.

In some embodiments, the fourth distance may correspond to a distance determined by subtracting the distance of the printable portion from the leading edge from the sum of the fourth predetermined distance 228 and the length of the plurality of labels 117. In such an embodiment, the I/O device interface unit 508 may be configured to determine the fourth predetermined distance. Further, in such an embodiment, the burn line 208 aligns with the printable portion on the label 117b after retraction.

As described, the first signal from the first media sensor 202 (which is positioned closer to the print head 110 in comparison to the second media sensor 204) is used to realign the label 117b with the burn line 208 during retraction of the media 116 along the media path 118. Therefore, the alignment of the label 117b with the print head 110 can be more accurate than a scenario where only the second signal from the second media sensor 204 is utilized to align the label 117b with the print head 110. If the calculation of realignment is only based on the second signal from the second media sensor 204, various factors (for example, but not limited to, feed error due varying tension of the media 116 along the media path 118) may have led to inaccurate alignment of the label 117b with the print head 110.

If, at step 1008, the image processing unit 516 determines that the printed content is not acceptable, the image processing unit 516 may be configured to perform step 1028. At step 1028, the I/O device interface unit 508 may cause the media 116 to retract along the media path 118 in the retract direction. At step 1030, the signal processing unit 514 may be configured to analyze the first signal to detect the sudden increase or sudden decrease in the measurement of the transmissivity/reflectivity of the media 116. The sudden increase or the sudden decrease in the measurement of the transmissivity/reflectivity of the media 116 may depict the traversal of the either the leading edge 119b or the trailing edge 119c over the first media sensor 202. To determine which edge has traversed over the first media sensor 202, at step 1032, the I/O device interface unit 508 determines whether the length of the plurality of labels 117 is greater than or equal to a predetermined distance between the verifier scan line 218 and the first media sensor scan line 224. If the I/O device interface unit 508 determines that the length of the plurality of labels 117 is greater than or equal to the predetermined distance between the verifier scan line 218 and the first media sensor scan line 224, the I/O device interface unit 508 performs the step 1020. At step 1020, the I/O device interface unit 508 determines that the leading edge 119b of the label 117b has traversed over the first media sensor 202. Accordingly, the I/O device interface unit 508 may be configured to cause the media 116 to retract by the third distance at block 1022.

If at step 1032, the I/O device interface unit 508 determines that length of the plurality of labels 117 is less than the predetermined distance between the verifier scan line 218 and the first media sensor scan line 224, the I/O device interface unit 508 may determine that the trailing edge 119c has traversed over the first media sensor 202. Accordingly, the I/O device interface unit 508 may cause the media 116 to retract by the fourth distance at block 1026.

Figure 11:
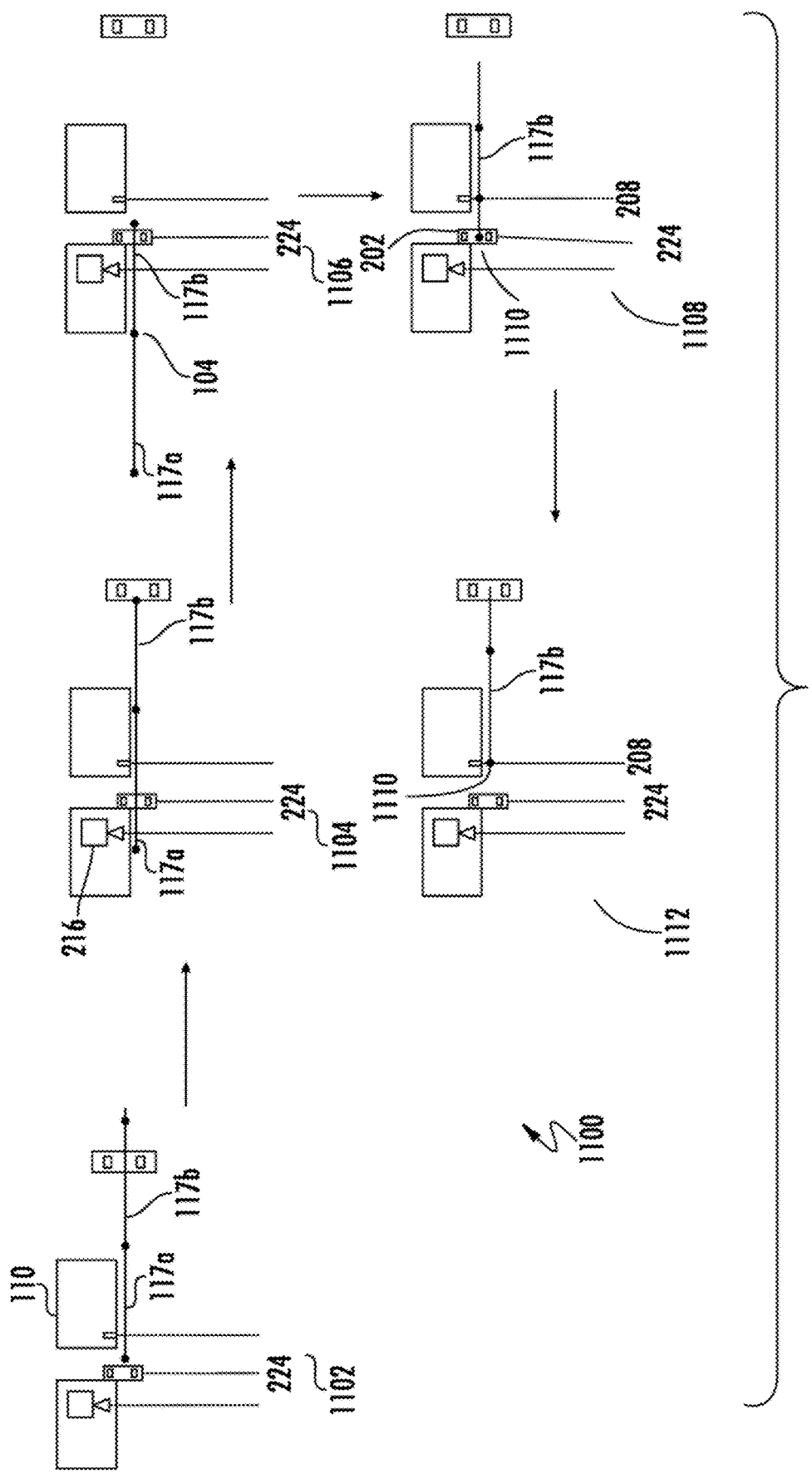
FIG. 11 illustrates various schematics of an example method of operating the printer apparatus in the print mode, according to one or more embodiments described herein.

FIG. 11 illustrates an example method 1100 of operating the printer apparatus 100 in the print mode, according to one or more embodiments described herein.

The example method 1100 illustrates a series of schematics of the printer apparatus 100 depicting the various states of the printer apparatus 100 during the operation of the printer apparatus 100 in the print mode. For example, the schematic 1102 of the printer apparatus 100 depicts that label 117a is under the print head 110 for the print head 110 to print content on the label 117a. After the print head 110 prints content on the label 117a, the I/O device interface unit 508 causes the media 116 to move in the print direction such that the label 117a is under with the image capturing device 216 in the image verifier housing 112, as is depicted in the schematic 1104. As described, the image capturing device 216 may be configured to capture an image of the printed content. Thereafter, the image processing unit 516 may be configured to verify the printed content to determine whether the printed content is acceptable.

After the image processing unit 516 determines that the printed content is acceptable, the I/O device interface unit 508 may cause the media 116 to traverse along the media path 118 in the print direction to output the label 117a from the printer media output 104, as is illustrated in schematic 1106. As illustrated, the label 117b (on which the content is to be printed next) gets misaligned during the outputting of the label 117a from the printer media output 104.

Accordingly, the I/O device interface unit 508 causes the media 116 to move in the retract direction along the media path 118. During the retraction of the media 116 along the media path 118, the signal processing unit 514 may be configured to analyze the first signal generated by the first media sensor 202 to detect a sudden increase in the measurement of the transmissivity of the media 116. As described, the sudden increase in the measurement of the transmissivity may indicate that the leading edge (depicted by 1110) has been detected by the first media sensor 202. The schematic 1108 depicts such state of the printer apparatus 100 where the leading edge 1110 of the label 117*b* is aligned with the first media sensor scan line 224.

Thereafter, the I/O device interface unit 508 causes the media 116 to traverse by the third distance. After traversal of the media 116 by the third distance in the retract direction, the leading edge 1110 of the label 117*b* is aligned with the burn line 208, as illustrated in schematic 1112.

As described, when a new media roll is installed in the printer apparatus 100 (for example, at step 618 of FIG. 6), the processor 502 causes the printer apparatus 100 to operate in the new media mode. The operation of the printer apparatus 100 in the new media mode is herein described in conjunction with FIG. 12.

Figure 12:
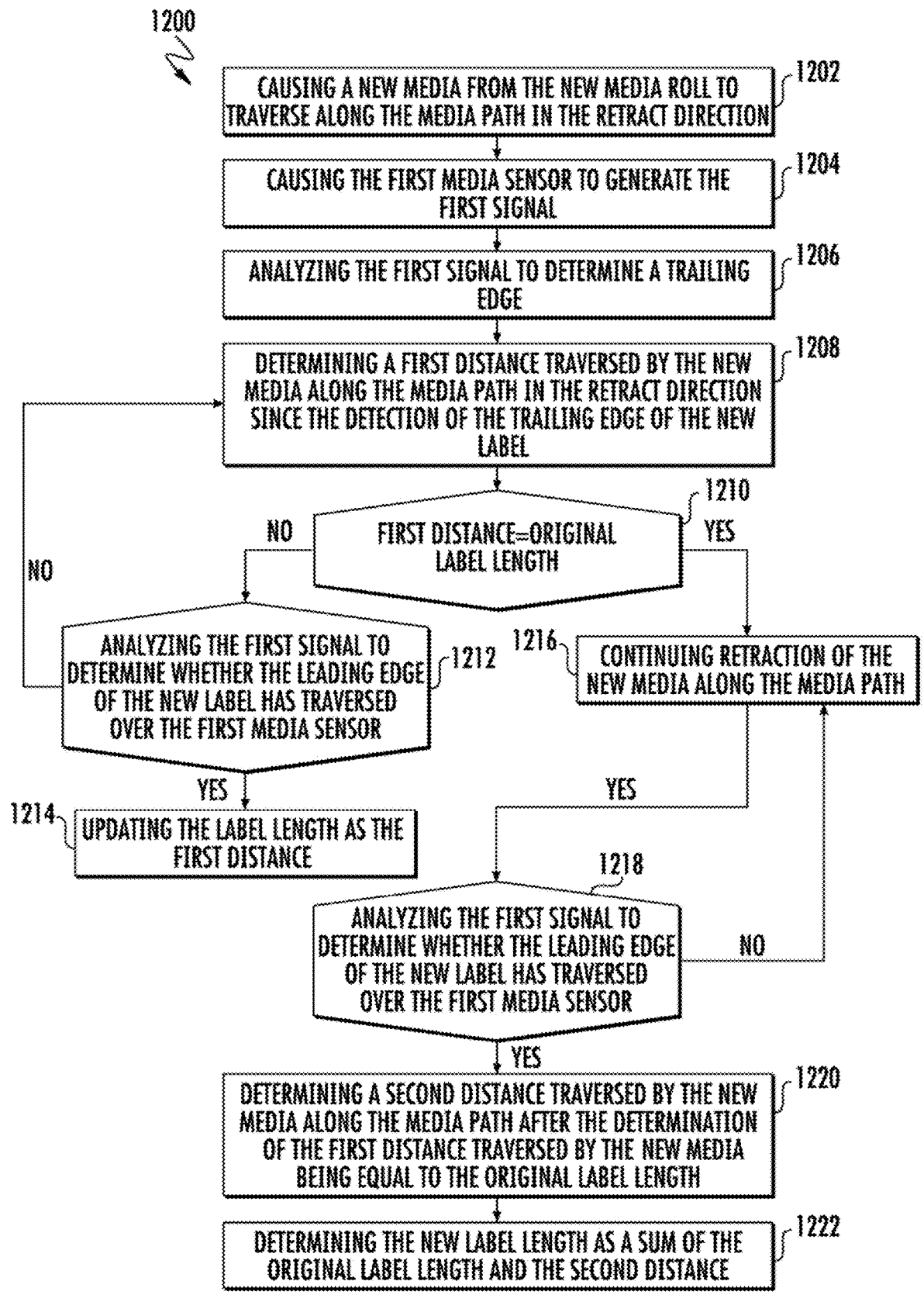
FIG. 12 illustrates a flowchart for operating the printer apparatus in a new media mode, according to one or more embodiments described herein.

FIG. 12 illustrates a flowchart 1200 for operating the printer apparatus 100 in the new media mode, according to one or more embodiments described herein.

At step 1202, the printer apparatus 100 may include means, such as the control system 206, the processor 502, the I/O device interface unit 508, and/or the like, for causing a new media from the new media roll (hereinafter referred to as new media) to traverse along the media path 118 in the retract direction. In an example embodiment, the new media includes a plurality of new labels. In some embodiments, when the new media roll is installed in the printer apparatus 100, certain portion of the new media is retrieved from the new media roll and is placed along the media path 118 manually so that the new media extends between the new media roll and the printer media output 104. After such placement of the portion of the new media along the media path 118, the first new label (on which the content is to be printed) is not aligned with the print head 110. Therefore, on installation of the new media roll, the I/O device interface unit 508 causes the new media to traverse in the retract direction to align the first new label with the print head 110.

As described, the I/O device interface unit 508 may actuate the first electrical drive, causing the new media to move along the media path 118 in the retract direction. In some examples, the I/O device interface unit 508 may cause the new media to retract along the media path 118 with the determined linear speed. As described, to cause the new media to traverse along the media path 118 with the determined linear speed, the I/O device interface unit 508 actuate the first electrical drive at the predetermined angular speed.

At step 1204, the printer apparatus 100 may include means, such as the control system 206, the processor 502, the I/O device interface unit 508, the signal processing unit 514, and/or the like, for causing the first media sensor 202 to generate the first signal during the traversal of the new media along the media path 118 in the retract direction.

At step 1206, the printer apparatus 100 may include means, such as the control system 206, the processor 502, the I/O device interface unit 508, the signal processing unit 514, and/or the like, for analyzing the first signal to detect a trailing edge of the new label based on the sudden increase/decrease in the measurement of the transmissivity/reflectivity of the new media. As described, the sudden increase/decrease in the measurement of the transmissivity/reflectivity of the new media may indicate traversal of the leading edge or the trailing edge of a new label of plurality of new labels over the first media sensor 202. Because a portion of the new media has been placed along the media path 118, the signal processing unit 514 may determine the first instance of the sudden increase/decrease in the measurement of the transmissivity/reflectivity as the trailing edge. In an example embodiment, the signal processing unit 514 may be configured to utilize methodologies described in the step 1016 of FIG. 10. In response to the detection of the trailing edge of the new label, the printer apparatus 100 may include means, such as the control system 206, the processor 502, the I/O device interface unit 508 and/or the like, for continuing retraction of the new media along the media path 118 in the retract direction.

At step 1208, the printer apparatus 100 may include means, such as the control system 206, the processor 502, the I/O device interface unit 508, the media alignment unit 518, and/or the like, for determining a first distance traversed by the new media along the media path 118 in the retract direction after the detection of the trailing edge of the new label. As described, the I/O device interface unit 508 causes the new media to traverse along the media path 118 with the determined linear speed. Therefore, the media alignment unit 518 may be configured to determine the first distance traversed by the new media along the media path 118 in the retract direction based on the determined linear speed and a time duration elapsed since the detection of the trailing edge of the new label. In an example embodiment, the I/O device interface unit 508 may utilize mathematical relations between the distance, speed, and time to determine the first distance traversed by the new media along the media path 118 in the retract direction.

At step 1210, the printer apparatus 100 may include means, such as the control system 206, the processor 502, the I/O device interface unit 508, the media alignment unit 518, and/or the like, for determining whether the first distance traversed by the new media satisfies the original label length (as determined in, for example, step 906 of FIG. 9). For example, if the media alignment unit 518 determines that the first distance traversed by the new media along the media path 118 in the retract direction is equal to the original label length, the media alignment unit 518 determines that the first distance traversed by the new media satisfies the label length. Accordingly, the media alignment unit 518 may be configured to perform step 1216. However, if the media alignment unit 518 determines that the first distance traversed by the new media along the media path 118 is not equal to the label length, the media alignment unit 518 may be configured to perform step 1212.

At step 1212, the printer apparatus 100 may include means, such as the control system 206, the processor 502, the I/O device interface unit 508, the media alignment unit 518, the signal processing unit 514, and/or the like, for analyzing the first signal to determine whether the leading edge of the new label has traversed over the first media sensor 202. As described, to determine whether the leading edge of the new label has traversed over the first media sensor 202, the signal processing unit 514 may be configured to detect the sudden increase/decrease in the measurement of the transmissivity/reflectivity of the new media (e.g., based on the one or more characteristics of the first signal). If the first signal indicates the sudden increase/decrease in the measurement of the transmissivity/reflectivity of the new media, the media alignment unit 518 may determine that the leading edge of the new label has traversed over the first media sensor 202. Accordingly, the media alignment unit 518 may be configured to perform step 1214. However, if the media alignment unit 518 determines that the leading edge of the new label has not traversed over the first media sensor 202, the media alignment unit 518 may be configured to perform step 1208.

At step 1214, the printer apparatus 100 may include means, such as the control system 206, the processor 502, the I/O device interface unit 508, the media alignment unit 518, and/or the like, for updating the label length as the first distance. Because the leading edge of the new label traverses over the first media sensor 202 prior to the new media traversing the distance equal to the original label length (i.e., the length of the label determined for plurality of labels 117 in the media 116), a label length of the plurality of new labels in the new media is less than the original label length of the original plurality of labels 117. Accordingly, the media alignment unit 518 may be configured to determine the new label length as the first distance.

In other words, if a leading edge of the new label is detected prior to a distance traversed by the new media is equal to the label length, the printer apparatus 100 may continue causing the new media to retract along the media path in the retract direction until the leading edge is detected. The printer apparatus 100 may then determine a first distance that the new media traversed after the detection of the trailing edge and before the detection of the leading edge based on the first signal, and set the first distance as the label length for the new labels.

If, at step 1210, the media alignment unit 518 determines that the first distance traversed by the media 116 is equal to the label length, the printer apparatus 100 may include means, such as the control system 206, the processor 502, the I/O device interface unit 508, the media alignment unit 518, and/or the like, for continuing retraction of the new media along the media path 118 at step 1216.

At step 1218, the printer apparatus 100 may include means, such as the control system 206, the processor 502, the I/O device interface unit 508, the media alignment unit 518, the signal processing unit 514, and/or the like, for analyzing the first signal to determine whether the leading edge of the new label has traversed over the first media sensor 202. In some examples, the signal processing unit 514 may be configured to utilize similar methodologies as described in the step 1212 to determine whether the leading edge of the new label has traversed over the first media sensor 202. If the signal processing unit 514 determines that the leading edge of the new label has not traversed over the first media sensor 202, the media alignment unit 518 may be configured to perform step 1216. However, if the signal processing unit 514 determines that the leading edge of the new label has traversed over the first media sensor 202, the media alignment unit 518 may be configured to perform step 1220.

At step 1220, the printer apparatus 100 may include means, such as the control system 206, the processor 502, the I/O device interface unit 508, the media alignment unit 518, and/or the like, for determining a second distance traversed by the new media along the media path 118 (in the retract direction) after the determination of the first distance traversed by the new media being equal to the original label length. In an example embodiment, the media alignment unit 518 may be configured utilize similar methodologies as is described in the step 1208 to determine the second distance.

At step 1222, the printer apparatus 100 may include means, such as the control system 206, the processor 502, the I/O device interface unit 508, the media alignment unit 518, and/or the like, for determining the new label length as a sum of the original label length and the second distance.

In other words, if the new media traverses a first distance (equal to the old label length) prior to the printer apparatus 100 detecting a leading edge of the new label based on the first signal, the printer apparatus 100 may retract the new media until the leading edge of the new label is detected. The printer apparatus 100 may then determine a second distance that the new media traversed after the new media has traversed by the old label length and before the leading edge of the new label is detected, and calculate the new label length of the new label by adding the old label length and the second distance.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art, the order of steps in some of the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an," or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any processor, controller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively or in addition, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may include RAM, ROM, EEPROM, FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. A printer apparatus comprising:
   a printer housing having at least a printer media output;
   a media hub configured to receive a media roll and supply a media from the media roll along a media path in a print direction to the printer media output, wherein the media includes a plurality of labels;
   a print head disposed adjacent to the media path and is downstream of the media hub in the print direction, wherein the print head is configured to print content on the plurality of labels;
   a first media sensor disposed downstream of the print head in the print direction at a predetermined distance from the print head, wherein the first media sensor is disposed between the print head and the printer media output in the print direction, wherein the first media sensor is configured to generate a first signal indicative of a position of the plurality of labels on the media path; and
   a processor communicatively coupled to the media hub, the first media sensor and the print head, wherein the processor is configured to:
      cause the media hub to retract the media in a retract direction along the media path, wherein the retract direction is opposite to the print direction;
      monitor the first signal received from the first media sensor, during the retraction of the media along the media path, to detect at least one of a leading edge or a trailing edge of a label of the plurality of labels; and
      in response to detecting the at least one of the leading edge or the trailing edge of the label during the retraction of the media along the media path, cause the media to retract by at least the predetermined distance between the first media sensor and the print head to align the label with the print head.

2. The printer apparatus of claim 1, further comprising a second media sensor disposed upstream of the print head along the media path with respect to the print direction, wherein the second media sensor is configured to generate a second signal indicative of the position of the plurality of labels on the media path.

3. The printer apparatus of claim 1, further comprising an image verifier housing disposed in the printer housing, wherein an image capturing device and the first media sensor are disposed in the image verifier housing, wherein the image capturing device is configured to capture an image of the printed content.

4. The printer apparatus of claim 3, wherein the processor is communicatively coupled to the image capturing device, wherein the processor is further configured to verify the printed content based on the captured image.

5. The printer apparatus of claim 4, wherein in an instance in which the verification of the printed content fails, the processor is configured to cause the media to retract along the media path.

6. The printer apparatus of claim 3, wherein the first media sensor is positioned in the image verifier housing such that the first media sensor is positioned upstream of the image capturing device along the media path with respect to the print direction, wherein a first distance between the print head and the first media sensor along the media path is shorter than a second distance between a second media sensor and the print head along the media path.

7. The printer apparatus of claim 1, further comprising a tear bar positioned proximal to the printer media output and is positioned downstream of the first media sensor, wherein the tear bar is configured to facilitate tearing of the plurality of labels outputted from the printer media output.

8. The printer apparatus of claim 1, wherein the processor is configured to cause the media to retract along the media path in response to elapsing of a predefined time period.

9. The printer apparatus of claim 1, wherein the processor is further configured to:
   determining a label length of the plurality of labels;
   determine whether the media hub has received a new media roll based on one or more parameters associated with the new media roll, wherein the new media roll includes new media that further includes a plurality of new labels;
   based on determining that the media hub receives the new media roll, cause the new media in the new media roll to retract along the media path in the retract direction until a trailing edge of a new label is detected based on the first signal;
   based on detection of the trailing edge of the new label, cause the new media to retract along the media path in the retract direction until a first distance traversed by the new media is equal to the label length prior to a leading edge of the new label is detected based on the first signal;
   upon determining that the first distance traversed by the new media is equal to the label length, retract the new media until the leading edge of the new label is detected by the processor based on the first signal;
   determine a second distance that the new media traversed after the new media has traversed by the label length and before the leading edge of the new label is detected by the processor based on the first signal; and
   modify the label length by the second distance.

10. The printer apparatus of claim 1, wherein the processor is further configured to:
 determine a label length of the plurality of labels;
 determine whether the media hub has received a new media roll based on one or more parameters associated with the new media roll, wherein the new media roll includes new media that further includes a plurality of new labels;
 based on determining that the media hub receives the new media roll, cause the new media in the new media roll to retract along the media path in the retract direction until a trailing edge of a new label is detected based on the first signal;
 based on detection of the trailing edge of the new label, cause the new media to retract along the media path in the retract direction until a leading edge of the new label is detected based on the first signal, prior to a distance traversed by the new media is equal to the label length;
 determining a first distance that the new media traversed after the detection of the trailing edge and before the detection of the leading edge based on the first signal; and
 modify the label length as the first distance.

11. The printer apparatus of claim 1, wherein the processor is configured to:
 in response to detecting the trailing edge of the label, cause the media to retract by a sum of the predetermined distance and a label length of the label.

12. A method for operating a printer apparatus comprising a print head, the method comprising:
 causing, by a processor, a media hub of the printer apparatus to retract a media in a retract direction along a media path;
 causing, by the processor, a first media sensor to generate a first signal indicative of a position of a plurality of labels on the media along the media path, wherein the first media sensor is disposed between the print head and a printer media output in a print direction opposite to the retract direction;
 monitoring, by the processor, the first signal received from the first media sensor, during the retraction of the media along the media path, to detect at least one of a leading edge or a trailing edge of a label of the plurality of labels; and
 in response detecting the at least one of the leading edge or the trailing edge of the label during the retraction of the media along the media path, causing, by the processor, the media hub to retract the media by at least a predetermined distance to align the label with the print head, wherein the predetermined distance is a distance between the print head and the first media sensor.

13. The method of claim 12 further comprising causing, by the processor, a second media sensor to generate a second signal indicative of the position of the plurality of labels on the media path, wherein the second media sensor is disposed upstream of the print head along the media path.

14. The method of claim 12 further comprising causing, by the processor, the print head to print content on the label.

15. The method of claim 14 further comprising:
 causing, by the processor, an image capturing device to capture an image of the printed content on the label; and
 verifying, by the processor, the printed content based on the captured image.

16. The method of claim 15 further comprising:
 determining, by the processor, the verification of the printed content fails; and
 causing, by the processor, the media hub to retract the media along the media path.

17. The method of claim 12 further comprising causing, by the processor, the media to retract along the media path in response to elapsing of a predefined time period.

18. The method of claim 12, further comprising:
 determining a label length of the plurality of labels;
 determining whether the media hub has received a new media roll based on one or more parameters associated with the new media roll, wherein the new media roll includes new media that further includes a plurality of new labels;
 based on determining that the media hub receives the new media roll, causing the new media in the new media roll to retract along the media path in the retract direction until a trailing edge of a new label is detected based on the first signal;
 based on detection of the trailing edge of the new label, causing the new media to retract along the media path in the retract direction until a first distance traversed by the new media is equal to the label length prior to a leading edge of the new label is detected based on the first signal;
 upon determining that the first distance traversed by the new media is equal to the label length, causing the new media to retract until the leading edge of the new label is detected by the processor based on the first signal;
 determining a second distance that the new media traversed after the new media has traversed by the label length and before the leading edge of the new label is detected; and
 modifying the label length by the second distance.

19. The method of claim 12, further comprising:
 determining a label length of the plurality of labels;
 determining whether the media hub has received a new media roll based on one or more parameters associated with the new media roll, wherein the new media roll includes new media that further includes a plurality of new labels;
 based on determining that the media hub receives the new media roll, causing the new media in the new media roll to retract along the media path in the retract direction until a trailing edge of a new label is detected based on the first signal;
 based on detection of the trailing edge of the new label, causing the new media to retract along the media path in the retract direction until a leading edge of the new label is detected based on the first signal prior to a distance traversed by the new media is equal to the label length;
 determining a first distance that the new media traversed after the detection of the trailing edge and before the detection of the leading edge based on the first signal; and
 modifying the label length as the first distance.

20. The method of claim 12, further comprising:
 in response to detecting the trailing edge of the label, causing the media to retract by a sum of the predetermined distance and a label length of the label.

* * * * *